(12) United States Patent
Pallarès et al.

(10) Patent No.: US 12,440,818 B2
(45) Date of Patent: Oct. 14, 2025

(54) INDUCED CIRCULATION AMONG INTEGRATED BUBBLING ZONES

(71) Applicant: BioShare AB, Karlstad (SE)

(72) Inventors: David Pallarès, Gothenburg (SE); Martin Seemann, Gothenburg (SE); Henrik Ström, Stenungsund (SE); Henrik Thunman, Partille (SE); Anton Larsson, Gothenburg (SE); Christer Gustavsson, Karlstad (SE)

( * ) Notice: Subject to any disclaimer, the term of this patent is extended or adjusted under 35 U.S.C. 154(b) by 1035 days.

(21) Appl. No.: 17/251,242

(22) PCT Filed: Dec. 9, 2018

(86) PCT No.: PCT/IB2018/059806
§ 371 (c)(1),
(2) Date: Dec. 11, 2020

(87) PCT Pub. No.: WO2019/239209
PCT Pub. Date: Dec. 19, 2019

(65) Prior Publication Data
US 2021/0245130 A1     Aug. 12, 2021

(30) Foreign Application Priority Data

Jun. 11, 2018  (WO) .................. PCT/IB2018/054187
Jun. 11, 2018  (WO) .................. PCT/IB2018/054189

(51) Int. Cl.
*B01J 8/36*     (2006.01)
*B01J 8/18*     (2006.01)
(Continued)

(52) U.S. Cl.
CPC .............. *B01J 8/36* (2013.01); *B01J 8/1818* (2013.01); *B01J 8/1827* (2013.01); *B01J 8/26* (2013.01);
(Continued)

(58) Field of Classification Search
CPC .. F23C 10/005; F23C 10/20; F23C 2206/102; C10B 49/22; C10J 3/482; C10J 2200/152;
(Continued)

(56) References Cited

U.S. PATENT DOCUMENTS 2,656,258  A    10/1953  Symonds et al.
4,102,773  A     7/1978  Green et al.
(Continued)

FOREIGN PATENT DOCUMENTS

CN         1330700 A     1/2002
CN       109945172 B     9/2020
(Continued)

OTHER PUBLICATIONS

U.S. Appl. No. 16/620,510, Ström, Henrik, Recovery of Chemicals from Fuel Streams, filed Dec. 8, 2019, Jun. 2, 2022; Sep. 9, 2022.
(Continued)

*Primary Examiner* — Imran Akram
(74) *Attorney, Agent, or Firm* — Bresbo AB

(57) ABSTRACT

Various aspects provide for a fluidized bed reactor comprising a container having a bed of bed solids and a splashgenerator configured to impart a directed momentum to a portion of the bed solids. A bedwall may separate the bed solids into first and second reaction zones, and the directed momentum may be used to transfer bed solids from one zone to the other. A return passage may provide for return of the transferred bed solids, providing for circulation between the zones. A compact circulating bubbling fluidized bed may be integrated with a reactor having first and second stages, each with its own fluidization gas and ambient. A multistage reactor may comprise a gaswall separating at least the gas phases above two different portions of the bed. A gaslock beneath the gaswall may provide reduced gas transport while allowing bed transport, reducing contamination.

21 Claims, 12 Drawing Sheets

(51) Int. Cl.

| | |
|---|---|
| *B01J 8/26* | (2006.01) |
| *B01J 8/34* | (2006.01) |
| *C10J 3/48* | (2006.01) |
| *F15D 1/00* | (2006.01) |
| *F22B 31/00* | (2006.01) |
| *F23C 10/00* | (2006.01) |
| *F23C 10/06* | (2006.01) |
| *F23C 10/20* | (2006.01) |
| *F23C 10/30* | (2006.01) |
| *B01J 8/24* | (2006.01) |

(52) U.S. Cl.
CPC . *B01J 8/34* (2013.01); *C10J 3/48* (2013.01); *C10J 3/482* (2013.01); *F15D 1/00* (2013.01); *F23C 10/005* (2013.01); *F23C 10/06* (2013.01); *F23C 10/30* (2013.01); *B01J 8/24* (2013.01); *F22B 31/0092* (2013.01); *F23C 10/20* (2013.01)

(58) Field of Classification Search
CPC ...... B01J 2208/0084; B01J 2208/00938; B01J 8/26; B01J 8/1872; B01J 8/34; B01J 8/36
See application file for complete search history.

(56) References Cited

U.S. PATENT DOCUMENTS

| | | | |
|---|---|---|---|
| 4,205,962 | A | 6/1980 | Marion et al. |
| 4,225,415 | A | 9/1980 | Mirza et al. |
| 4,276,062 | A | 6/1981 | Lyon et al. |
| 4,588,418 | A | 5/1986 | Gabler et al. |
| 4,682,986 | A | 7/1987 | Lee et al. |
| 4,823,712 | A | 4/1989 | Wormer |
| 4,828,486 | A | 5/1989 | Sakamoto et al. |
| 5,961,786 | A | 10/1999 | Freed et al. |
| 6,530,978 | B2 | 3/2003 | McQuigg et al. |
| 7,214,252 | B1 | 5/2007 | Krumm |
| 8,500,959 | B2 | 8/2013 | Lehto |
| 9,580,657 | B2 | 2/2017 | Heydenrych et al. |
| 2006/0000143 | A1 | 1/2006 | Nagato et al. |
| 2006/0137579 | A1 | 6/2006 | Fujimura et al. |
| 2007/0014704 | A1* | 1/2007 | Hashimoto ............. F27B 14/10 422/139 |
| 2007/0283902 | A1 | 12/2007 | Maryamchik et al. |
| 2009/0065437 | A1 | 3/2009 | Mohedas |
| 2010/0024297 | A1 | 2/2010 | Suda et al. |
| 2010/0139534 | A1 | 6/2010 | Tsantrizos |
| 2011/0042277 | A1 | 2/2011 | Briens et al. |
| 2011/0073049 | A1 | 3/2011 | Maryamchik et al. |
| 2012/0012039 | A1 | 1/2012 | Palmas et al. |
| 2013/0064722 | A1 | 3/2013 | Lankinen |
| 2013/0087084 | A1 | 4/2013 | Sato |
| 2013/0098277 | A1 | 4/2013 | Kawai et al. |
| 2013/0327629 | A1 | 12/2013 | Palmas et al. |
| 2014/0008205 | A1* | 1/2014 | Heydenrych ........... F23C 10/01 202/121 |
| 2014/0102342 | A1 | 4/2014 | Maryamchik et al. |
| 2015/0118723 | A1 | 4/2015 | Duzoglou |
| 2015/0329358 | A1 | 11/2015 | Konda et al. |
| 2016/0130503 | A1 | 5/2016 | Heydenrych |
| 2016/0214893 | A1 | 7/2016 | Komatsu et al. |
| 2016/0290632 | A1 | 10/2016 | Pohl et al. |
| 2017/0120211 | A1 | 5/2017 | Adham et al. |
| 2017/0189877 | A1 | 7/2017 | Abdullah et al. |
| 2019/0048273 | A1 | 2/2019 | Verberne et al. |

FOREIGN PATENT DOCUMENTS

| | | |
|---|---|---|
| EP | 0 597 683 A2 | 5/1994 |
| EP | 1 043 385 A1 | 10/2000 |
| EP | 2 428 546 A1 | 3/2012 |
| EP | 3 287 197 A1 | 2/2018 |
| FI | 112087 B | 12/2001 |
| FR | 2.203.964 | 5/1974 |
| GB | 1 508 777 A | 4/1978 |
| JP | 2006132885 | 5/2006 |
| JP | 2016 138694 A | 8/2016 |
| WO | WO2010/139854 A1 | 12/2010 |
| WO | WO 2011/0454473 A1 | 4/2011 |

OTHER PUBLICATIONS

U.S. Appl. No. 16/973,814, Gustavsson, Christer, Biomass Upgrading System, filed Dec. 10, 2020.
English translation of CN 109945172, cited in Swedish patent application No. 2230025-5 (Sep. 4, 2020).
Office action issued by the Swedish patent office in Swedish patent application No. 2230025-5 (Sep. 2022).
U.S. Appl. No. 16/973,814, Gustavsson, Christer, Biomann Upgrading System, filed Dec. 10, 2020, Nov. 21, 2023.
U.S. Appl. No. 18/519,022, Gustavsson, Christer, Bubbling Fluidized Bed Reactor, filed Nov. 26, 2023.
2nd Office action issued by the Swedish Patent Office in Swedish patent application No. 2030362-4 Dec. 2022.
U.S. Appl. No. 16/620,510, Ström, Henrik Streams, Recovery of Chemicals from Fuel Streams, filed Dec. 8, 2019, Jun. 2, 2022; Sep. 9, 2022; May 9, 2023.
Response to 2nd Office action issued by the Swedish Patent Office in Swedish patent application No. 2030362-4, Apr. 2023.
Supplemental Response to 1st Office action issued by the Swedish Patent Office in Swedish patent application No. 2030362-4 Nov. 2022.
Machine translation of CN 1330700 (Fujimura et al.). Jan. 2002.
International Search Report and Written Opinion prepared by the EPO in PCT patent application PCT/IB2023/050596 May 2023.
U.S. Appl. No. 16/620,510, Ström, Henrik, Recovery of Chemicals from Fuel Streams, filed Dec. 8, 2019, Jun. 2, 2022.
"Added value from biomass by broader utilization of fuels and CHP plants," Gustavsson, Christer; Doctoral Thesis, Karlstad University, Dec. 2016.
"Biomass pyrolysis for liquid biofuels: production and use" Rizzo, Andrea Maria; Doctoral Thesis, University of Florence, Dec. 2014.
"Challenges and opportunities with an industrial-scale integrated bio-oil plant" Autio, Joakim et al., IEA Bioenergy Conference, Vienna, Austria (Nov. 2012).
"Control of the solids retention time by multi-staging a fluidized bed reactor," Zhao, Ke et al.; Fuel Processing Technology 167, 171-182 (Jul. 2017).
Office action issued by the Finnish patent office in related application, FI patent application No. 20170148 (Mar. 2018).
English Abstract transation (WIPO) of JP 2006132885, Combustion Method and Device for Wet Waste, (May 2006).
Machine translation of JP 2006132885, Combustion Method and Device for Wet Waste, (May 2006).
Response to Office action issued by the Finnish patent office in related application, FI patent application No. 20170148 (Jun. 2018).
International Search Report, Written Opinion, and Search Strategy for related application PCT/IB2018/054187 Dec. 2018.
Response to ISR/WO in PCT/IB2018/054187) filed with entry into the European regional phase for European patent application No. 1873 9642.9 Jan. 2020.
1st Office action issued by the European Patent Office in European patent application No. 1873 9642.9 Feb. 2021.
Response to 1st offfice action issued by the European Patent Office in European patent application No. 1873 9642.9 Jun. 2021.
2nd Office action issued by the European Patent Office in European patent application No. 1873 9642.9 Aug. 2021.
Response to 2nd office action issued by the European Patent Office in European patent application No. 1873 9642.9 Feb. 2022.
1st Office action issued by the Swedish Patent Office in Swedish patent application No. 2030005-9 Aug. 2020.
Response to 1st Office action issued by the Swedish Patent Office in Swedish patent application No. 2030005-9 Feb. 2021.
Supplemental response to 1st Office action issued by the Swedish Patent Office in Swedish patent application No. 2030005-9 Oct. 2021.

(56) References Cited

OTHER PUBLICATIONS

International Search Report, Written Opinion, and Search Strategy for related application PCT/IB2018/054189 Dec. 2018.
International Search Report, Written Opinion, and Search Strategy for related application PCT/IB2018/059806 Dec. 2019.
Response to ISR/WO in PCT/IB2018/059806) filed with entry into the European regional phase for European patent application No. 1883 0946.2 Dec. 2020.
1st Office action issued by the European Patent Office in European patent application No. 18 830 946.2 Aug. 2021.
Response to 1st Office action issued by the European Patent Office in European patent application No. 18 830 946.2 Dec. 2021.
1st Office action issued by the Swedish Patent Office in Swedish patent application No. 2030362-4 Sep. 2021.
Response to 1st Office action issued by the Swedish Patent Office in Swedish patent application No. 2030362-4 Jan. 2022.
International Search Report, Written Opinion, and Search Strategy for related application PCT/IB2019/054766 Dec. 2019.
Response to ISR/WO in PCT/IB2019/054766 filed with entry into the European regional phase for European patent application No. 1974 2914.5 Dec. 2020.
1st Office action issued by the Swedish Patent Office in Swedish patent application No. 2030363-2 Sep. 2021.
Response to 1st Office action issued by the Swedish Patent Office in Swedish patent application No. 2030363-2 Mar. 2022.
3rd Office action issued by the Swedish Patent Office in Swedish patent application No. 2030362-4 Mar. 2024.
3rd Office action issued by the Swedish Patent Office in Swedish patent application No. 2030363-2 Mar. 2024.
Response to the 3rd Office action issued by the Swedish Patent Office in Swedish patent application No. 2030362-4 May 2024.
Response to the 3rd Office action issued by the Swedish Patent Office in Swedish patent application No. 2030363-2 May 2024.
Response (inc. claims) to 3rd Office action issued by the European Patent Office in European patent application No. 1873 9642.9 Apr. 2024.
U.S. Appl. No. 16/620,510, Ström, Henrik, Recovery of Chemicals from Fuel Streams, filed Dec. 8, 2019, Jun. 2, 2022; Sep. 9, 2022; May 9, 2023.
U.S. Appl. No. 16/973,814, Gustavsson, Christer, Biomass Upgrading System, filed Dec. 10, 2020, Nov. 21, 2023.
U.S. Appl. No. 18/519,022, Gustavsson, Christer, Bubbling Fluidized Bad Reactor, filed Nov. 26, 2023.
U.S. Appl. No. 18/728,865, Köhler, Anna, Continuous Char Seperation Reactor, filed Jul. 13, 2024.
Examiner Interview summary issued by the Swedish Patent Office in Swedish patent application No. 2030362-4 Jan. 2025.
Supplemental response submitted to the Swedish Patent Office in Swedish patent application No. 2030362-4 Feb. 2025.
Office action issued by the Canadian patent office in application CA3,218,934 Nov. 2024.
Response to office action issued by the Canadian patent office in application CA 3,218,934 Mar. 2025.

* cited by examiner

INDUCED CIRCULATION AMONG INTEGRATED BUBBLING ZONES

CROSS REFERENCE TO RELATED APPLICATIONS

The present application is the National Phase of PCT application no. PCT/IB2018/059806, filed Dec. 9, 2018, and claims the priority benefit of PCT patent applications no. PCT/IB2018/054187 and PCT/IB2018/054189, each of which was filed Jun. 11, 2018, the disclosures of which are incorporated by reference herein.

BACKGROUND

1. Technical Field

The present invention relates generally to fluidized bed reactors, particularly to bubbling fluidized bed reactors, and to the recovery and use of volatile species in fluidized bed systems.

2. Description of Related Art

Typical fluidized bed reactors are based on either so-called circulating fluidized bed (CFB) or so-called bubbling fluidized bed (BFB) designs. CFB reactors typically utilize smaller particles than BFB. A CFB reactor in a combustion application typically has an average particle size between 0.2 and 0.4 mm, whereas a BFB has an average particle size that is approximately 1 mm. The larger particles of BFB lend themselves to "bubbling" under economic reaction conditions.

The small particle sizes of CFB lend themselves to long-distance, convective, gas-entrained "circulation" (like a dust storm). CFB reactors are based on "fast" fluidization, thereby utilizing higher gas velocities than those associated with the bubbling regime (itself below the turbulent regime). The resulting "dust storm" of entrained particles and fuel in a typical circulation regime is entirely different than the discrete, dense, "bed phase" of a bubbling fluidized bed, notwithstanding the "CFB" nomenclature. In prior CFB systems, circulation of particles from a circulation reactor to a second "storage" reactor and back entails the use of a riser (built into the circulation reactor), followed by separation of the particles from the gas phase (typically with a cyclone). The riser carries the particles upwards over tens of meters, during which reactions and heat exchange (e.g., to heat steam) occur. The particles are later separated from the gas phase and dropped via a downcomer back to the other reactor. The reactors are spatially separated from each other, with ductwork guiding a convective "wind" that carries particles through the ducts between reactors. CFB reactors operate with high gas velocities and concomitantly entrained particles-ostensibly not even as "beds" per se. A "pre-bed" storage bed may capture and store those particles.

Typical CFB-circulation designs do not work well (and are often incompatible with) BFB particles. Circulation of the relatively large BFB particles in prior CFB designs require very high gas velocities to lift the particles in the riser and/or separate them in the cyclone. These high velocities are expensive to generate and difficult to manage. The large, high velocity particles are erosive and readily damage the walls and other surfaces of the plant. Conversely, the use of CFB particles in a BFB is also problematic. The use of the relatively smaller CFB particles in a BFB requires the use of relatively low gas velocities (in the bubbling bed) to properly "bubble" the bed of CFB particles. As a result, very large beds are required to achieve desired reaction rates. CFB and BFB designs each have their advantages. BFB reactors benefit from certain features associated with their relatively larger BFB particles, notwithstanding that such reactors cannot practically be made into "circulating" reactors. CFB designs provide for circulation between reactors. It would be advantageous to combine the advantages of a CFB (e.g., circulation) with those of a BFB (e.g., bubbling).

Fluidized bed reactors are typically designed to operate in a particular fluidization regime. In standard bubbling fluidized bed technology, fluidization at different gas fluidization velocities does not result in long-range entrainment of particles. An aligned, directed, long-range "jetting" or "spraying" is well recognized as deleterious to bed performance. Thus, standard gas fluidization nozzles typically have a shape that prevents long-range entrainment of bed particles with fluidization gas (e.g., "mushroom shape" or other reversing nozzles). Such nozzles typically redirect gas partly downward and/or sideways, and the gas flows from adjacent nozzles impinge on each other, resulting in efficient mixing and rapid, short-range convection. By redirecting gas flow downward and causing fast convection/turbulence, even a very high gas velocity does not result in long-range "jetting" or "spraying" out of the top surface of the bed.

Various references describe adding a fluidization bed to a circulating fluidized bed (CFB) combustor. JP 2005-274015 A, JP 2004-132621A, JP 2005-41959A, JP 2006132885, and US 2010/0024297 describe a CFB combustor having a riser/cyclone/downcomer circuit to recycle particles from the CFB combustor into another fluidized bed. U.S. Pat. No. 4,823,712 describes the use of screw conveyors to transport solids between beds. Such conveyors are prone to erosion by the solids.

EP1043385 describes a "Fuel Gasifying System" (Title) "which does not need the special control of a pressure balance between a gasification furnace and a char combustion furnace." (Abstract, para. [0014]) U.S. patent application Ser. No. 11/485,375 (pub.no. US 2007/0014704) describes a "Fluidized-Bed Gasification Furnace" (Title) having an "integrated gasification furnace having a gasification chamber . . . and a combustion chamber . . . for combusting a pyrolysis residue such as char and tar produced by the gasification." (para. [0019]) EP0597683 describes a "Fluidized bed reactor and system and method utilizing same." (Title) Certain references monitor bed temperatures in adjacent gasifying and char combusting chambers. Combustion heat from the combustion chamber is transported (via the bed solids) to heat the gasification chamber. Bed transport from the combustion chamber to the gasifying chamber is controlled only to achieve the desired gasifying chamber temperature. Fuel residence time, reaction kinetics, char residence time, bed homogeneity, and/or other parameters are apparently ignored as long as the desired bed temperature is achieved.

The prior art is silent with respect to the control of fuel or char residence time. EP1043385 and U.S. Ser. No. 11/485,375 control bed flow from a combustion chamber to a gasification chamber to achieve a desired temperature in the gasification chamber (via hot bed solids from the combustion chamber), resulting in an uncontrolled pressure difference between the chambers. Reaction rates in the chambers and residence times in the chambers are ignored. Additionally, the highly fluidized regions immediately adjacent to openings between the chambers create significant cross-contamination of gases between the ostensibly separate chambers. EP 1 043 385 places a char combustion chamber 4 immediately adjacent to a gasification chamber 1. An opening 25 between these chambers ostensibly provides for bed flow, but also allows significant cross-contamination between the different fluidization gases (combustion and gasification) from the adjacent diffusion devices on either side of the opening. US 2007/0014704 faces a similar problem with opening 52 allowing cross-contamination of the different gases from adjacent diffusion devices 73 (combustion gas) and 74 (gasifying gas).

SUMMARY

Aspects describe a fluidized bed reactor having a splashgenerator configured to impart a directed momentum to a particular portion of the bed, causing an active, controllable circulation/movement of bed solids within the bed. Using a particular wall configuration, injection nozzle geometry/velocity, and/or injection flow rate, the splashgenerator typically creates a very low-density splashzone (as compared to the fluidized bed), typically having fast-fluidized, turbulent-fluidized, and/or entrained bed solids. The splashgenerator may be used to increase convection within the bed (e.g., to enhance in-bed transport of fuel within a single bed) and/or transport the bed solids relatively long distances (as compared to convection within the bed).

An otherwise contiguous fluidized bed reactor may be divided into reaction zones (e.g., by the use of two different fluidization gas inlets, typically utilizing different fluidization gases, temperatures, flow rates, and the like). Reaction zones may be separated by a bedwall which separates at least a portion of the bed of one zone from at least a portion of the bed of an adjacent zone, facilitating different reactions on either side of the wall (e.g., by using different bed temperatures, bed heights, and the like). The bedwall typically modifies, inhibits, and/or prevents solids transport between the zones under standard fluidization conditions (e.g., the top of the wall may above the normally-fluidized bed height). A splashgenerator in one zone may impart a relatively high velocity directed momentum to a portion of the solids in that zone to drive (splash, spray, jet) bed solids (e.g., with fuel, char, and the like) through/over/past the wall into the other zone, where a subsequent reaction may occur. The solids may be splashed over and/or through an opening in the bedwall. A return passage allows the bed solids to recirculate back to the first zone. When the splashgenerator is turned off, the bedwall substantially prevents bed communication between the zones (except for insubstantial convective flow via a return passage). A first zone may be used to volatilize a fuel with a less oxidizing gas such as N2 and/or steam to create a volatiles stream and char, and bed solids/char the resulting char may be splashed to a second zone where the char is combusted with a more oxidizing gas such as air or oxygen.

An otherwise contiguous fluidized bed reactor may be divided into stages by a gaswall separating at least a gas phase above the bed. The different stages may be controlled to have different ambient pressures. Stages may substantially overlap with zones, but they need not be identical. The gaswall may be in a different location than the bedwall.

When not integrated into the same wall, the bedwall (separating the bed solids) and the gaswall (separating the gas phases) are typically separated by a gap that allows a drivenflow of solids (driven by the splashgenerator) to pass between the walls, while bed solids within the gap substantially block gaseous communication between the zones/stages. The gaswall need not be located directly above the bedwall (e.g., a single wall with an opening through).

The splash magnitude may be used to control solids flow, with higher magnitude increasing the flux of bed solids from one zone to the other. For zones at different temperatures, control of solids transport between zones via the splashgenerator-induced momentum may be used to control heat transport from one zone to the other. By integrating such a "compact circulation" functionality into a BFB, benefits of a CFB may be achieved using the bed characteristics (e.g., particle size) of a BFB. Circulation of bed material among the zones in an integrated bed may provide for different gases in different reactions zones with the reactivity of a bubbling bed using BFB particles, a compact design, and low cost. By integrating the zones within a single container, mass transfer (and especially heat transfer) from one zone to the next may be improved as compared to the discrete reactors of prior CFB designs. As compared to prior systems having complex circulation paths (risers, cyclones, separators, downcomers, and the like) various aspects provide for a much simpler, capital-efficient solution, enabling high, controlled reaction rates and/or multiple reaction zones, at lower capital cost, operational cost, and maintenance cost. Because long-distance "windstorm" convection is not required, erosion and other damage may be substantially reduced.

A fluidized bed reactor configured to react a fuel (or other substance) in a fluidized bed of bed solids may comprise a container configured to hold the bed of bed solids and a bedwall separating at least a portion (typically at least the bottom) of the bed of bed solids into first and second reaction zones. A first (e.g., LowOx) reaction zone has a first gas inlet disposed at a first portion of a bottom of the container and configured to fluidize the bed solids in the first reaction zone with a first gas (e.g., an inert and/or less-oxidizing gas) from a first gas supply to create a first bubbling fluidized bed. A second (e.g., HiOx) reaction zone has a second gas inlet disposed at a second portion of the bottom of the container and configured to fluidize the bed solids in the second reaction zone with a second gas from a second gas supply to create a second bubbling fluidized bed. The second gas may be different than (e.g., more or less oxidizing than) the first gas. A LowOx reaction zone may volatilize a fuel to yield a volatiles stream and char. Useful chemicals may be extracted from the volatiles stream (e.g., via a condensation/separation reactor). The char may be driven to a HiOx reaction zone where it is combusted by a more oxidizing second gas to yield an exhaust gas.

The reactor may comprise at least one gaswall separating at least the gas phase above the bed into stages. For simplicity, different stages are described as a volatilization stage (e.g., comprising a LowOx reaction zone) and a combustion stage (e.g., comprising a HiOx reaction zone), although stages may be used differently (e.g., a first stage that is more oxidizing and/or hotter than a second stage). A first (e.g., volatilization) stage may comprise a fuel inlet configured to convey fuel (or other chemical) into the first stage/zone, an outlet (e.g., a volatiles stream outlet configured to convey a volatiles stream resulting from volatilization), and typically a pressure gauge to measure pressure within the stage. A second (e.g., combustion stage) may comprise an outlet (e.g., an exhaust gas outlet configured to convey an exhaust gas resulting from char combustion within the stage), typically a pressure gauge to measure pressure within the stage, and optionally a second fuel inlet to convey fuel/chemical into the second stage/zone.

An opening through and/or below the gaswall (below least one, including both, of the expected fluidized bed heights of the first and second bubbling fluidized beds)

provides for a flow of solids between the first (e.g., volatilization) and second (e.g., combustion) stages (e.g., a drivenflow from a LowOx reaction zone to a HiOx reaction zone).

A passage between the first (e.g., LowOx) and second (e.g., HiOx) reaction zones is configured to provide for a flow of solids between the reaction zones (e.g., a returnflow from a HiOx reaction zone to a LowOx reaction zone). Solids may circulate between reaction zones (drivenflow->returnflow->drivenflow) while the gas phases over the stages remain separate. Each zone may have its own fluidization gas, temperature gas inlet velocity, and/or bed height (e.g., hydrostatic pressure at the bottom of the bed). Each stage may have its own ambient pressure above its bed, evacuation rate, gas temperature, and gas phase composition.

The reactor may comprise one or more means to control gas flow into/out of, and/or pressure within, at least one (including both) stage, particularly a valve, fan, eductor, ejector, and the like (e.g., coupled to a stage's gas outlet, a fuel inlet, and the like). Each stage may have its own means.

A splashgenerator coupled to a transport gas supply is configured to inject a transport gas, which may be the same or different a one or both of the first and second gases used at the fluidization gas inlets of the zones. The splashgenerator injects the transport gas into a portion of the bed solids in one zone (e.g., the LowOx reaction zone) to drive (splash/spray/jet) a drivenflow of bed solids from that zone past the bedwall into the other reaction zone (e.g., the HiOx reaction zone). A transport gas may comprise flue gas and/or steam. The splashgenerator and walls may form a transport chamber that conveys bed solids (e.g., with char) between zones while keeping the gases of each stage substantially separated. A splashgenerator may inject transport gas to drive bed solids from a first stage to a second stage and/or from a first zone to a second zone. A splashgenerator may be incorporated in a reactor having one stage and/or one zone.

A controller coupled to the pressure gauges of the stages and the means to control gas flow/pressure may be configured to control a pressure difference between the stages. The controller may control a residence time of fuel/char within a stage and/or a transport rate of bed solids/char between stages. Fluidization gas composition, temperature, and/or velocities of/pressure drop across the fluidization gas inlets may be controlled. The controller may control the splashgenerator (composition/temperature/velocity/pressure drop). Bed temperatures may be controlled. The combination of various control parameters may enable a precise combination of atmosphere, residence time, and temperature within a stage (e.g., a volatilization stage), which may facilitate the extraction of valuable chemicals from a fuel stream reacted in that stage.

The bedwall and gaswall are typically in different locations but may be integrated as one wall. The gaswall may be located in either reaction zone (e.g. a LowOx reaction zone), between zones, or even overlap both zones. The gaswall may have a lower edge below the normally fluidized bed height. A first stage may the same or different gas as a second stage. A gap/passage provide for solids circulation between the stages/zones but typically prevent gas phase circulation.

The volatilization stage may comprise a fuel inlet configured to receive the fuel, a first gas inlet disposed at a bottom of the container within volatilization stage, and a LowOx gas supply configured to supply an inert and/or mildly oxidizing gas to the first gas inlet to fluidize the bed of bed solids within the first reaction zone and pyrolyze/gasify/reform/evaporate or otherwise react (herein: volatilize) the fuel to yield a volatiles stream and a char stream. A volatiles stream outlet is configured to convey the volatiles stream out of the volatilization stage, and a volatiles pressure gauge may be configured to measure pressure within the volatilization stage.

The combustion stage may comprise a second gas inlet comprising an oxidant inlet disposed at a bottom of the container within the combustion stage, and a HiOx gas supply configured to supply a gas that is more oxidizing than the gas supplied by the LowOx gas supply. The oxidant supply and oxidant inlet are configured to fluidize the bed of bed solids in the combustion stage and combust a char stream received from the volatilization stage (via the returnflow) to yield an exhaust gas. An exhaust gas outlet conveys the exhaust gas out of the combustion stage, and a combustion pressure gauge may be configured to measure pressure within the combustion stage.

One or stages may be fluidically coupled to a means to control gas flow and/or pressure (e.g., a valve, a fan, an ejector, a gas inlet, a fuel inlet, and/or an oxidant inlet) into/out of/within the stage. A controller coupled to the pressure gauges and the flow/pressure means provides for the control of the pressures of (e.g., pressure difference between) the stages, which may be used to control a residence time within a stage (e.g., a fuel/char residence time in a volatilization stage). The controller may be configured to regulate the flow of bed solids and/or char between stages. The controller may control one or both gas inlet flow velocities and/or pressure drops. The controller may control the splashgenerator.

A passage may comprise an opening in/below a wall. A passage typically allows solids transport but substantially prevents gas transport (e.g., the gaswall descends into the bed within the passage). A reactor may include a passage gas inlet (e.g., below a gaswall) configured to fluidize the bed solids within the passage with a (same or different) passage gas. An angled passage gas inlet 414' may direct injected gases at an angle (e.g., toward a stage to which solids in the passage are flowing and/or away from a stage sensitive to contamination) and may use jet, high velocity, and/or directed nozzles. In an embodiment, a volatilization stage is fluidized with steam, CO2, syngas, and/or another volatilization/pyrolization/gasification gas, a combustion stage is fluidized with air and/or oxygen, and a transport gas comprises flue gas, steam, or air. A passage gas inlet may include a splashgenerator (e.g., having high velocity nozzles, jet nozzles, high fluidization rates, and the like).

A bedwall and a gaswall may be separated by a distance that is greater than zero, including at least 5%, including at least 10%, of at least one expected fluidized bed height. The walls may be separated by a distance that is not more than three times, including below 2×, including less than, including below 75%, below 50%, below 30%, of at least one expected fluidized bed height. A splashgenerator may be disposed between a bedwall and a gaswall when they are separated. A splashgenerator and gaswall may be disposed on opposite sides of a bedwall. A bedwall and gaswall may be integrated into the same wall (e.g., an opening within the bed, below the top of the bed and above the bottom of the bed).

The walls typically allow controlled solids circulation (e.g., with char, fuel) between the stages via the gap/passage but prevent communication of the gas phases of the stages (other than that small portion of gas entrained with the solids as they traverse from one stage to the other). A gap/opening allows the drivenflow of solids to flow into the volatilization stage. A corresponding opening in/below the second wall allows the returnflow solids to return to the combustion stage, while the gas phases remain separate. The first reaction zone may be operated at higher pressure than the second reaction zone, yet the momentum created by the splashgenerator can "push" solids against a gas pressure gradient (from the second reaction zone into the first reaction zone). Thus, the gas phases above the volatilization stage (first reaction zone) and combustion stage (second reaction zone) may be independently controlled, and bed transfer between the stages may be independently controlled (e.g., the relative flow rates of the drivenflow (into the volatilization stage) and returnflow (into the combustion stage) in combination with the momentum control of the splashgenerator.

The drivenflow and returnflow may create a circulation between two zones in an otherwise integrated fluidized bed. Circulation enables certain functionality of a CFB, even for a BFB bed. As compared to typical CFBs (risers, cyclones, and the like) in which high velocity convection is used to blow particles long distances (several meters to tens of meters) on a "wind" of gas through various ducts, the splashzone entrains particles in much shorter paths-merely enough to get past the wall separating the zone (tens of cm, typically less than 1-2 meters). As a result, erosion may be reduced or largely eliminated. Solids can be transported from one zone to another without requiring that they contact metal surfaces at high velocities. Bed solids (typically relatively large BFB particles) may be circulated between the two stages while the two stages are part of the same bed, enabling "circulation" at reduced capital and operational expense. Heat transfer, compactness, and energy efficiency may be substantially improved. The relatively low particle velocities minimize the impact of particles against various surfaces (e.g., eroding walls). As a result, reactors may be longer lasting and less prone to wear. Combustion is typically more exothermic than volatilization (which may require heat). Integration of the volatilization and combustion stages into an otherwise contiguous bed typically minimizes undesired heat loss, and a splashgenerator disposed in the combustion stage may effectively transfer heat from the (hotter) combustion bed into the cooler volatilization bed, providing an integrated, controlled series of reactions at high overall efficiency.

A fuel processing system may comprise a reactor having a splashgenerator, a volatilization stage and a combustion stage, and a separation reactor coupled to the reactor (e.g., a volatiles stream outlet of the volatilization stage). The separation reactor may be configured to receive the volatiles stream from the volatilization stage, and may comprise a heat exchanger, condenser, a cyclone, and/or other separator configured to separate chemical species from the volatiles stream. The separation reactor may separate out a desired chemical species from the volatiles stream, leaving a residual stream. The residual stream may be sent to a different reactor, another combustor, and/or the combustion stage. The chemical species may be used as needed (e.g., combusted, refined, processed, stored).

In an embodiment, a fluidized bed reactor (e.g., a BFB) comprises a container configured to hold a bed of bed solids and a first gas inlet configured to fluidize the bed solids with a first gas to create a first bubbling fluidized bed. A splashgenerator coupled to a transport gas supply may be configured to inject the transport gas into the first fluidized bed to impart a localized, directed, relatively high momentum to a portion of the bed (e.g., an aligned spray or jet), typically to convey the splashed solids over a distance (e.g., through and/or above the bed) that is at least 20 cm, including over 40 cm, including over 80 cm, including over 1 meter. The splashgenerator may comprise aligned jet nozzles and/or high velocity nozzles. The directed momentum is typically much higher than that used for normal fluidization of the bed (especially when used without a transport chamber), such that solids acted on by the splashgenerator are preferentially accelerated (e.g., sprayed or jetted) as compared to the surrounding solids that are merely fluidized. The splashzone may comprise turbulent-fluidized, fast-fluidized, and/or entrained solids. The splashgenerator may be used to increase circulation within a bubbling fluidized bed (e.g., to circulate fuel away from a fuel inlet, increasing fuel dispersion). The directed momentum may be at least partially horizontal (e.g., like a hot-tub jet) which may enhance horizontal convection in the bed. The splashgenerator may be configured to inject the transport gas at a velocity, pressure, and/or flow rate that is higher, including at least 2× higher, including at least 3× higher, including at least 5× higher, including at least 10× higher than the corresponding velocity, pressure, or flow rate of velocity than that of at least one, including both, gas inlets.

A gaswall may separate at least a gas phase above the bed into first and second stages. The gaswall may have an opening below an expected fluidized bed height within the container, providing for a flow of bed solids. The reactor may comprise a second gas inlet configured to fluidize the bed solids with a second gas (e.g., different than at least one of the first gas and transport gas) to create a second bubbling fluidized bed, yielding a first reaction zone associated with the first bed and a second reaction zone associated with the second bed. The splashgenerator may drive solids between zones. A bedwall may be disposed between the first and second gas inlets to separate at least a portion (e.g., the bottom) of the bed into a first reaction zone comprising the first gas inlet and a second reaction zone comprising the second gas inlet. The splashgenerator may be configured to splash, spray, and/or jet a drivenflow of bed solids from one of the first and second reaction zones to the other. A reactor may include a gaswall disposed below an expected fluidized bed height of at least one, including both, of the first and second bubbling fluidized beds.

A reactor may comprise a container configured to hold a bed of bed solids, a first gas inlet configured to fluidize a first portion of the bed solids with a first gas to create a first bubbling fluidized bed, and a second gas inlet configured to fluidize a second portion of the bed solids with a second gas to create a second bubbling fluidized bed. The portions (e.g., the gas inlets) may be separated by bedwall (e.g., between the first and second gas inlets) separating the bed into a first reaction zone having the first gas inlet and a second reaction zone having the second gas inlet. A gaswall may separate at least a gas phase above the bed, and may be disposed in either zone. An opening through/below the gaswall and below at least one, including both, of the expected fluidized bed heights of the zones provides for flow comprising bed solids between the zones. A splashgenerator disposed between the bedwall and the gaswall is configured to inject a transport gas into a portion of the bed solids in one reaction zone to create a drivenflow past the bedwall into the other reaction zone.

A multistage fluidized bed reactor may comprise a container configured to hold a bed of solids. A first gas inlet is disposed at a first portion of the bottom of the container and configured to fluidize the first portion with a first gas to create a first bubbling fluidized bed. A second gas inlet is disposed at a second portion of the bottom and configured to fluidize that portion with a second, particularly different, gas to create a second bubbling fluidized bed. A gaswall separates at least the gas phase above the bed into first and second stages. The stages may use the same or different fluidization gases, and each stage may have independent control of fluidization gas, pressure, temperature, and gas phase composition. An opening through/below the gaswall (e.g., below at least one, including both, expected fluidized bed height) is configured to provide for a flow of bed solids (e.g., with char) between the stages.

A reactor may comprise a gaslock configured to inhibit transport of a gaseous phase between the stages. A gaslock is typically disposed proximate (including beneath) the gaswall, and may comprise a relatively less-fluidized region (e.g., with a lower fluidization rate, or even a non-fluidized portion of the bottom), creating a high-density region with relatively less gas transport than the adjacent fluidized regions (while allowing bed transport). A gaslock may comprise a passage gas inlet substantially below the opening (e.g., between the first and second gas inlets) and configured to fluidize the gaslock with a gas having a particular fluidization rate, velocity, direction, and the like that reduces contamination and/or enhances bed solids transport, which may be advantageous when the gases from adjacent gas inlets need to be separated (by the passage gas inlet). A gaslock may comprise a gas inlet that extends a distance beyond the gaswall into the next stage, particularly when contamination by one fluidization gas into the other stage is less problematic than the inverse. For example, contamination of a combustion stage with a volatilization gas may be preferable to contamination of the volatilization stage with the combustion gas, and so a volatilization gas inlet may be extended a distance into the combustion stage. Independent control of the gas pressure between the stages, combined with an appropriately dimensioned communication passage between the stages, enables a controlled transport of media (gas, bed solids) between the stages, but in some cases, the stages need not have independent pressure control.

A method may comprise providing a fluidized bed reactor (e.g., one or both of a multistage reactor and a reactor having a splashgenerator), fluidizing at least one bed, and reacting a substance (e.g., a fuel) in the bed.

DETAILED DESCRIPTION

Various aspects provide for a compact fluidized bed reactor that combines features previously associated either with circulating fluidized bed (CFB) or with bubbling fluidized bed (BFB) reactors. By separating a BFB into separate zones (e.g., each with its own fluidization gas, pressure, and/or temperature), and imparting a directed momentum to a localized portion of the solids in one zone to "splash" the solids into the other zone, benefits of a CFB may be achieved using the bed characteristics (e.g., particle size) of a BFB. Aspects may provide for significantly improved erosion resistance, longevity, thermal efficiency, and/or control of chemical reactions.

Figure 1:
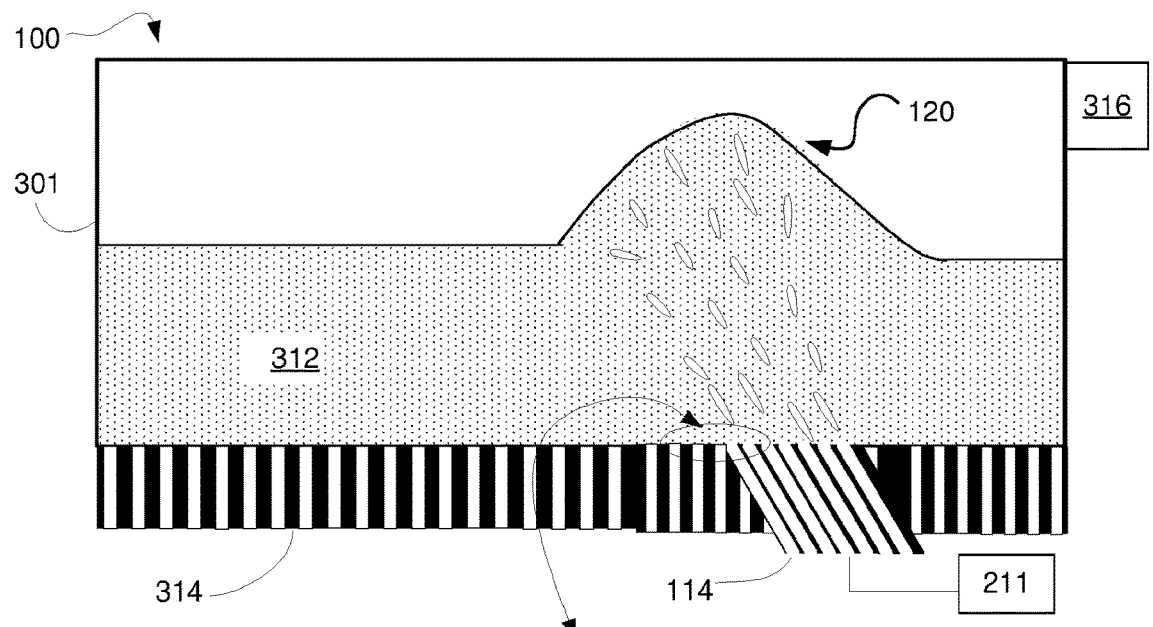
FIG. 1 is a schematic illustration of a splashgenerator operating in a fluidized bed, per an embodiment.

FIG. 1 is a schematic illustration of a side view of a splashgenerator operating in a fluidized bed, per an embodiment. Reactor 100 comprises a container 301 configured to contain a bed of bed solids. A gas inlet 314 coupled to a gas supply (not shown) is configured to fluidize the bed of solids with a gas in the fluidization regime to create a fluidized bed. Reactor 100 may be operated as a BFB or a CFB. A fuel inlet 316 delivers a material to be reacted in the bed (e.g., a fuel). Reaction typically takes place within the bed, as illustrated by reaction zone 312. The bed solids may have a mean particle diameter that is at least 0.4 mm, including at least 0.6 mm, particularly at least 0.75 mm, particularly at least 0.9 mm. Particles are typically below 2 mm, including up to 1.5 mm.

Reactor 100 includes a splashgenerator 114, typically configured to impart a directed, aligned momentum to a portion of the bed solids in reaction zone 312 (e.g., using high velocity jets of gas, large wave oscillations, acoustic/pressure pulses, and the like). Splashgenerator 114 is coupled to a transport gas supply (211) configured to supply a transport gas (e.g., flue gas, steam, air) to the splashgenerator. The momentum is typically at least partially upward; the momentum may be at least partially horizontal. The resulting momentum causes a localized portion of the bed solids in zone 312 to be preferentially accelerated, schematically illustrated as a splashzone 120. Splashzone 120 corresponds to a localized portion of the bed having higher velocity, higher magnitude, and/or otherwise different convection than that in the surrounding bed, and may comprises pulsed splashes, turbulent-fluidized, fast-fluidized, and/or entrained jets of solids. A splashgenerator may transport solids relatively long distances within/above the bed (e.g., at least 20 cm, including at least 40 cm, including at least 1m). Long distances generally require more energy, which may benefit from the use of pulsed splashes. A splashgenerator may create large waves of bed solids (e.g., having an amplitude larger than 20% of, including 50% of, including 80% of, the fluidized bed height). For simplicity, various figures illustrate splashzone 120 as "above" the bed; it may be within the bed (although such a configuration is not readily illustrated). The momentum imparted by the splashgenerator may be used to control convection, circulation, heat transfer, bed uniformity, stirring, and the like.

Gas inlet 314 typically comprises fluidization nozzles that inject gas downward, horizontally, and/or slightly upward (if the nozzles have inbuilt seal systems). Fluidization typically requires fast mixing/convection/turbulence. A splashgenerator 114 may comprise jet nozzles configured to inject aligned, substantially parallel jets of transport gas. The nozzles may be horizontal, but are typically at least partially upward, and are typically designed to generate jets rather than fluidization.

Splashgenerator 114 may be configured to inject a transport gas into the bed at a velocity, pressure, and/or flow rate that is higher than the corresponding velocity/pressure/flowrate of at least one gas inlet, including at least 2×, at least 3×, at least 5×, at least 10× higher. The gas injected by the splashgenerator may be the same or different as the fluidizing gas of the gas inlet 314. The temperature may be the same or different.

Figure 2C:
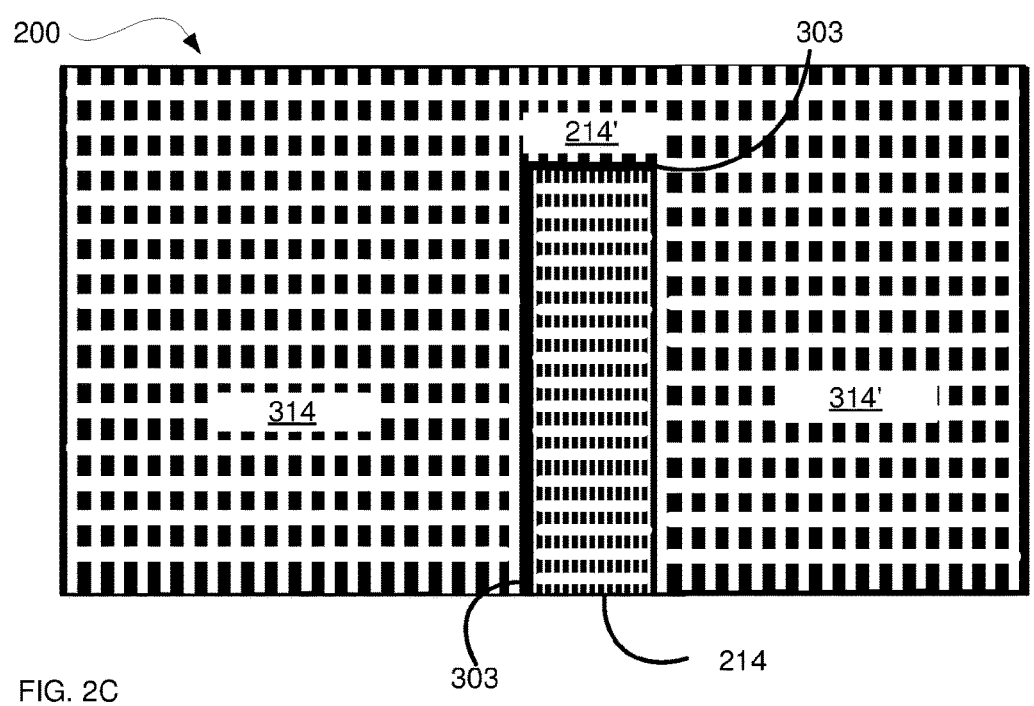
FIGS. 2A, 2B, and 2C are schematic illustrations of different views of a compact circulating bubbling fluidized bed reactor, per some embodiments.
Figure 2A:
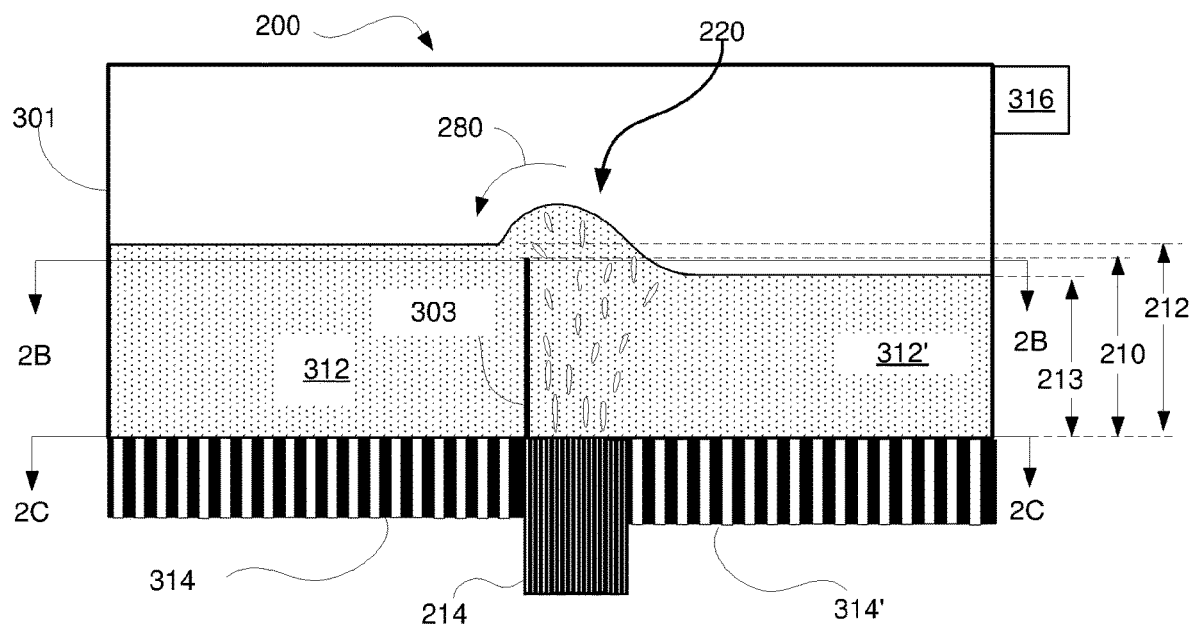
Figure 2B:
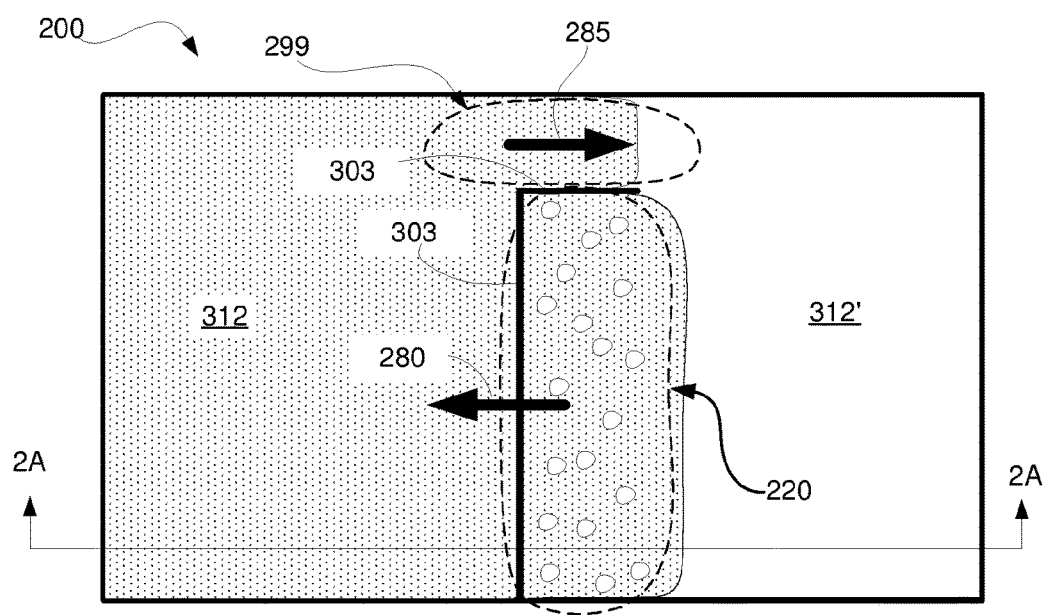

FIGS. 2A, 2B, and 2C are schematic illustrations of different views of a compact circulating bubbling fluidized bed reactor, per some embodiments. FIG. 2A illustrates a side view in cross section. In reactor 200, a container 301 contains a bed of bed solids. A bedwall 303 separates at least a portion of the bed into a first reaction zone 312 and a second reaction zone 312'. Bedwall 303 may partially separate the zones (e.g., allowing some convective flow). The wall may not extend entirely to the bottom of the bed or above the surface of the bed, although the wall typically separates at least the lowermost portions of the zones. The wall may substantially entirely separate the beds of the zones (e.g., FIG. 4A).

A height 210 of bedwall 303 may be higher than the expected fluidized height of at least the second reaction zone 312' (typically both zones 312/312') to prevent solids flow over the wall during normal fluidization. In FIG. 2A, height 210 is slightly below the normally fluidized heights of zones 312/312'. Height 210 may be below 90%, below 80%, including below 50% of the bed heights of both zones 312/312'. Bedwall 303 typically allows gaseous communication above the beds between the zones.

The zones may have different fluidization gases, temperatures, and/or otherwise enable different reactions in different zones. A gas inlet 314 at the bottom of the bed in the first reaction zone is configured to deliver a first gas to fluidize the bed solids in the first reaction zone 312. A gas inlet 314' at the bottom of the bed in the second reaction zone is configured to deliver a second (typically different) gas to fluidize the bed of bed solids in the second reaction zone 312'. The fluidization gas compositions, velocities, temperatures, and the like may be the same or different. Typically, at least one zone (including both) include a fuel inlet 316 to receive a fuel and/or other species to be reacted in the reactor. In this example, fuel inlet 316 delivers fuel to second reaction zone 312'. Various other inlets and outlets are not shown for simplicity.

A splashgenerator 214 is configured to impart a directed momentum to a portion of the bed solids in the second reaction zone 312' (e.g., using jets of gas, wave oscillations, pulses, and the like). The momentum is typically at least partially (and may be entirely) upward (e.g., for a high bedwall 303). The resulting momentum causes a localized portion of the bed solids in second reaction zone 312' to pass by/through/over/under bedwall 303 into the first reaction zone 312. One or more walls (not shown) may be used to direct momentum (e.g., funnel waves toward the wall). As compared to the normally fluidized bed height (when fluidized by its respective gas inlet) the added momentum of the splashgenerator may locally increase bed height-"splashing" bed solids and other material over the wall, and typically "sprays" or "jets" or otherwise entrains the solids to carry them long distances (e.g., over 20 cm) as compared to standard "fluidization" inlets. The directed flow from the splashgenerator typically increases the height 212 of the "receiving" first reaction zone 312 when the splashgenerator is operating (and correspondingly reduces the height 213 of second reaction zone 312') as illustrated schematically. Splashgenerator 214 may be configured to inject a gas into the bed at a velocity, pressure, and/or flow rate that is at least 20% higher than the corresponding velocity/pressure/flowrate of the second gas inlet 314', including at least 50%, including at least 2×, at least 5×, at least 10× higher. The gas injected by the splashgenerator may be the same or different as the fluidizing gas of the gas inlets. Drivenflow 280 may pass through an opening in bedwall 303.

As a result of the directed momentum generated by the splashgenerator, a localized flow of bed solids (drivenflow 280) is driven past/through (or in this illustration, over) bedwall 303 into first reaction zone 312. For simplicity, FIG. 2A illustrates drivenflow 280 as being associated with a splashzone 220, from which solids "splash over" bedwall 303, somewhat like a geyser spraying water out of a hole in the earth. A bedwall 303 may have a height (210) above at least one expected normally fluidized bed height 212, 213 of at least one of the reaction zones 312/312' (typically at least the reaction zone having the splashgenerator), such that solids do not traverse the wall during normal fluidization; they must be driven by the splashgenerator, independent of fluidization velocities, over the bedwall. The height of bedwall 210 may be at least 20%, including at least 40%, at least 100%, at least 150%, at least 200%, of the fluidized bed height (212, 213). The bedwall height may be 2× or even 3× the bed height. The splash zone may splash solids over the bedwall.

Although integrated into a single container, each zone may be operated as its own, independently controlled bubbling fluidized bed. In contrast to systems that incorporate risers, downcomers, cyclones for recovering bed solids, and the like, the reaction zones are integrated into the same container such that the beds have substantially the same bed heights and "share" solids via liquid-like flow. High flow rates over long distances may be avoided, significantly reducing energy consumption and erosion.

A bedwall 303 may be lower than, approximately equal to, or higher than, the "normally fluidized" bed heights, according to a desired amount of non-driven bed flow past the wall. A lower wall allows more "natural convection" bed flow; a higher wall reduces this convection. A wall extending above the bed surface substantially prevents this "natural convection" proximate the wall, and so transport between beds is more tightly controlled by the splashgenerator and corresponding returnflow (below).

An exemplary BFB reactor may have a stagnant bed height from 30-100 cm, including 40-70 cm, including from 50-60 cm. Fluidization by the gas inlet typically increases a fluidized bed height of the "fluidized" solids by 40-80%, including about 50-70%, over the stagnant bed height. Height 210 of bedwall 303 may be accordingly chosen to prevent substantial solids flow under normal fluidization conditions. Height 210 of bedwall 303 may be at least 140% of the expected stagnant bed height, including at least 150%, including at least 160%. For particularly energetic splash generators, height 210 may be 2× the expected stagnant bed height, including at least 3×, including at least 4×. For some reactors (e.g., with highly varying fuel particle sizes), a more energetic splashgenerator may reduce fuel segregation (e.g., ensuring large chunks of fuel pass over bedwall 303). A less energetic splashgenerator may ensure that larger chunks remain in the first reaction zone until they are small enough to pass to the second reaction zone.

FIG. 2B illustrates an overhead view of a section of reactor 200, and illustrates a passage 299 through which bed solids return from the first reaction zone 312 back to the second reaction zone 312'. Returnflow 285 of bed solids "returns" the solids driven by drivenflow 280, enabling circulation of solids between separate reaction zones of a single fluidized bed. Flow of solids past bedwall 303 (drivenflow 280 driven by splashgenerator 214) and corresponding returnflow 285 of the solids provides for a compact "circulating" fluidized bed having the benefits of bubbling fluidized beds—a compact, integrated, circulating, dual-zone bubbling, fluidized bed. A passage 299 may be fluidized by a passage gas inlet 214' (FIG. 2C), such that solids return via natural convection (flowing downhill according to the pressure gradient created by the drivenflow). A passage may include its own (typically horizontally directed) splashgenerator to increase horizontal velocity of the returnflow.

FIG. 2C illustrates an overhead view of another section of reactor 200, schematically illustrating the gas inlets at the "bottoms" of the relevant zones of the bed. The different gas inlets (314, 314') fluidize their respective zones, and passage gas inlet 214' fluidizes the returnflow 285 of solids returning from first reaction zone 312 to second reaction zone 312' (FIG. 2B). Passage gas inlet 214' may fluidize the solids in the passage using the same or different gas than that used by one or more of the gas inlets, typically with the same gas as that delivered by gas inlet 314' to fluidize the second reaction zone 312'.

It may be advantageous to combine a splash generator with a fuel stream processing system as disclosed in U.S. provisional patent application No. 62/517,186 and/or Finnish patent application no. 20170148, incorporated by reference herein. Various aspects may be used to control residence times and reaction rates within a stage, and heat and/or mass transfer between the stages, enabling a wide range of chemical reactions. Pressure control above each stage, gas inlet flow rates, bed heights (and thus hydrostatic pressure at the gas inlet) and/or pressure drop across the distributor plates themselves may be combined with flow control via directed and return flows (e.g., using a splash-zone between stages) to control residence times, heat transfer rates, mass transfer rates, and the relative concentration of various species.

A fuel stream processing system may comprise a volatilization stage and a combustion stage. The volatilization stage typically uses a relatively inert, and/or mildly oxidizing gas (e.g., N2, syngas, steam, CO2, and the like). A solid and/or liquid fuel stream flows into the volatilization stage to be reacted to form a volatiles stream and a char stream, which is passed to the combustion stage for combustion. The combustion stage typically uses a gas that is more oxidizing than the gas used in the volatilization stage. A volatilization stage may be retrofit to an existing combustion plant (e.g., with an additional fuel supply) to enable the extraction of a high-value volatiles stream prior to combustion. In Sweden, the population of biomass-fueled fluidized bed boilers is presently about 80% BFB/20% CFB. As such, the retrofit market may be larger in Sweden for BFB, although both designs offer opportunity.

A volatiles stream comprises chemical species that may be used directly (e.g., fed into a lime kiln or boiler) and/or separated out for subsequent use via a chemicals outlet. The chemical species may include syngas (H2+CO), raw gas, oils, chemical precursors, hydrocarbons (including oxygenated hydrocarbons), liquid fuels (e.g., C1-C25, including C4-C18), biofuels and/or biofuel precursors, volatile polymers, fuel gas, chemical compounds, fine chemicals, and the like. A volatilization stage may be used to separate a fuel into a first fuel source (e.g., for a separate combustion process, such as an engine or turbine) and a residual char source (e.g., for combustion in a fluidized bed). A volatiles stream may flow to a separation reactor (e.g., an arrangement comprising condensation, absorption, adsorption, and the like) to separate out various species. A heat exchanger may cool the volatiles stream to condense various (typically >5, including>10, including>100) chemical species from the volatiles stream. The separated chemical species may be subsequently processed and/or utilized. A residual stream (remaining, undesired chemicals which may have fuel value) separated from the desired chemical species may be combusted.

A volatiles stream may have a range of uses (according to fuel source, pretreatment conditions, and the like) such as for raw gas, syngas, and the like. The volatiles stream may include syngas (e.g., for use in a subsequent chemical process) gaseous species (e.g., gaseous fuels), liquid fuels (e.g., biofuels and/or biofuel precursors), and the like.

Figure 3A:
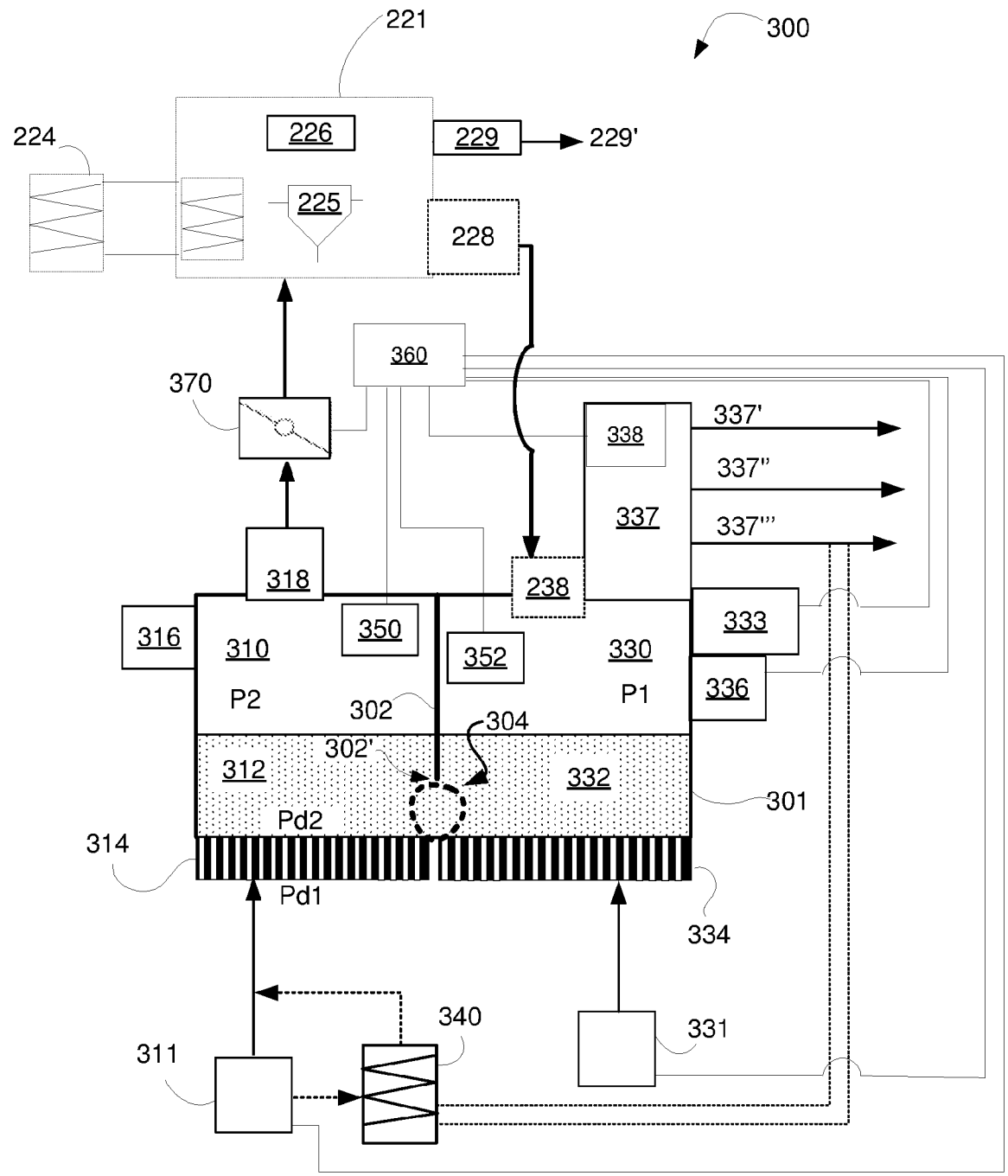
FIG. 3A is a schematic illustration of a two-stage fluidized bed reactor, per some embodiments.

FIG. 3A is a schematic illustration of a two-stage fluidized bed reactor, per some embodiments. A multistage fluidized bed reactor comprises a container 301 integrating a fluidized bed having at least a first (e.g., volatilization) and second (e.g., combustion) stages, each bed/stage enabling a different chemical reaction. In this example, a first reaction zone 312 in a first fluidized bed and a second reaction zone 332 in a second fluidized bed provide for different reactions. Stages are described as "volatilization" and "combustion" for simplicity; other series of reactions may also be implemented, according to the choice of gases, temperatures, and the like.

The gas phases above the first and second stages are separated by a gaswall 302, which allows the fluidized bed phases to communicate via an opening 304 below/in the wall and/or a passage between beds of the stages. Thus, the fluidized bed phase (e.g., media and char stream) may pass from the first stage to the second stage, but the gas phase above the first stage is separated from the gas phase above the second stage. The fluidized beds may communicate via an opening in the floor rather than the wall. The fluidization gases, temperatures, flow rates, and ambient gas phases may be independently controlled. A controller coupled to pressure gauges within the stages may control these pressures (e.g., via a valve, fan, ejector, and the like controlling ambient pressure in the stage) to achieve a desired overpressure of the first stage vs. the second stage. Pressure difference between stages may be used to control residence time of fuel particles (e.g., to achieve a desired reaction in the volatilization stage prior to char transfer to the combustion stage). A transfer of fuel and bed material from the first to second stages may be controlled via a sequential decrease and increase in gas pressure in the first stage vs. that in the second stage to "flush" material to the second stage (e.g., periodically, as "breathing" in and blowing out a deep breath). Fuel residence time may also be controlled by adjusting fluidization gas velocities and/or splashgenerator momentum.

In exemplary FIG. 3A, a fluidized bed reactor 300 comprises a container 301 (e.g., an otherwise contiguous single container) configured to hold a bed of bed solids. A gaswall 302 separates the container into a volatilization stage 310 and a combustion stage 330. Gaswall 302 includes a lower edge 302' and has an opening 304 below at least one, including both bed heights 212/213 (FIG. 2A) through which bed solids and char may flow. A vertical distance between the floor/gas inlet below gaswall and the lower edge 302' is typically from 0-90% of at least one bed height 212, 213 (FIG. 2A). Opening 304 may include a passage and/or a char stream outlet 219 to convey char from the volatilization stage and a char stream inlet 239 to convey the char into the combustion stage, and may include a passage 299 (FIG. 4B). Opening 304 may comprise openings in the floors of each stage coupled by a passage. Gaswall 302 may include a plurality of walls. The media and char stream pass from the volatilization stage to the combustion stage, where the char is burned. The wall lets the media/char pass between stages, but prevents mixing of the gas phases.

The volatilization stage has a fuel inlet 316 configured to receive and deliver the fuel into the volatilization stage. The fuel inlet may include a lock hopper and/or other apparatus to transfer solid fuel while controlling gas flow/pressure. Fuel may be fed by gravity and/or auger. Fuel may be delivered to the lock hopper (e.g., via a feed screw) and a gas pressure within the lock hopper may be controlled to match that of the volatilization stage, such that fuel may be delivered to the volatilization stage at or above the pressure of the volatilization stage.

The bed solids in the volatilization stage may be fluidized by a flow of gas from a LowOx gas supply 311 delivered via a gas inlet 314 (e.g., a diffuser plate/distributor plate having holes distributed across the plate to fluidize the bed, a set of nozzles coupled to one or several gas supply headers, and the like) to first reaction zone 312. LowOx gas supply 311 supplies a (typically hot) gas chosen according to desired volatilization conditions, fuel source, desired composition of volatiles stream, and the like. LowOx gas supply 311 typically supplies an inert and/or mildly oxidizing gas. In some cases, LowOx gas supply may supply a reducing gas (e.g., H2). Pressure drop across a distributor plate (e.g., Pd1-Pd2) may be controlled (typically in concert with gas pressure above the bed) to achieve a desired bubble size (within the bed), convection pattern, fuel residence time, bed temperature, and the like. Various reactions may be controlled via stage pressure (e.g., to control bed height, reaction rates, and/or residence times). A typical volatilization stage may have a lower temperature at the top of the bed than at the bottom (although in the absolute bottom of the bed (the first centimeters from the bottom) where the fluidization media enters the bed the temperature is typically lower). A reduced bed height in the volatilization stage typically reduces residence time within.

A reactor may comprise a volatiles stream outlet 318 configured to convey the volatiles stream out of the volatilization stage (e.g., to an optional separation reactor 221 for separating useful chemical species, typically after having removed bed solids). A separation reactor may physically separate (e.g., without chemical reactions) and/or chemically separate (e.g., adsorption). A separation reactor may include a first cyclone to remove bed solids and a subsequent arrangement (including a second cyclone) to remove chemical species. A volatiles pressure gauge 350 measures gas pressure in the volatilization stage, the volatiles stream outlet, and/or the corresponding volatiles line. Useful chemical species 229' are typically extracted from the volatiles stream via chemicals outlet 229, and may leave a residuals stream. A separation reactor may include a heat exchanger 224, a cyclone 225, or other phase separator 226 configured to separate species (e.g., a filter, bag house, electrostatic precipitator, scrubber, quenching) as needed to separate the volatiles into useful chemical species and a residual stream. A heat exchanger 224 may extract heat from a volatiles stream and preheat the gas flowing to a gas inlet. In some cases, a volatiles stream is rapidly quenched (immediately after volatilization) to prevent polymerization of desirable discrete molecules. A reactor may include an absorption loop that exposes a stream to a liquid that absorbs a species (e.g., an amine CO2 scrubber). The liquid is circulated out, the species is removed, and the liquid is reexposed to the stream. In some cases, separation reactor 221 outputs a residuals stream (e.g., comprising residual chemicals not extracted for other purposes) via residuals stream outlet 228. Residuals stream outlet 228 may be coupled to a corresponding residuals stream inlet 238 of the combustion stage, providing for the combustion of the residuals stream, return of bed solids, and the like.

A reactor includes a means to control gas flow into and/or out of at least one stage, including multiple stages. Controlling this means in concert with pressure measurements, the controller may control the pressure difference between stages, typically via closed-loop (e.g., PID) control. In FIG. 3A, a volatiles outlet valve 370 (e.g., a butterfly valve) coupled to the volatilization stage outlet 318 is configured to control pressure in the volatilization stage and/or flow out of the volatiles stream outlet (shown upstream of separation reactor 221; it may also be downstream).

Combustion stage 330 includes an oxidant inlet 334 (e.g., a diffuser plate) correspondingly disposed with second reaction zone 332. A HiOx gas supply 331 coupled to the oxidant inlet may deliver a relatively more oxidizing gas than that of the LowOx gas supply (typically 02 and/or air) at a flow rate and pressure sufficient to fluidize the bed solids in the combustion stage and combust the char from the volatilization stage. An exhaust gas outlet 337 removes combustion products such as power 337', chemicals 337" and/or heat 337'", which may be subsequently harvested from the exhaust gas (e.g., via a heat exchanger, a turbine, and the like, not shown). A combustion pressure gauge 352 disposed in the combustion stage and/or exhaust measures pressure in the combustion stage. Reactor 300 illustrates an optional $2^{nd}$ oxidant inlet 333 (e.g., to provide additional combustion air to supplement oxidant supplied via oxidant inlet 334). Additional gas and/or oxidant inlets may be included with the relevant stage. In this example, a fan 338 fluidically coupled to the exhaust 337 controllably extracts exhaust gas, which may be used to control pressure.

A controller 360 coupled to the pressure gauges (in this case, 350, 352, measuring P2 and P1 respectively) and one or more pressure control means controls a pressure difference between the stages. In FIG. 3A, controller 360 is coupled to a volatiles outlet valve 370 (illustrated upstream of optional separation reactor 221; it may be downstream, particularly downstream of a heat exchanger). In this example, controller 360 controls pressure in the volatilization stage (above first reaction zone 312) via throttling of the valve 370. During operation, controller 360 typically controls pressure of the volatilization stage to be different than that of the combustion stage. Higher pressure in the volatilization stage typically decreases fuel/char residence time; lower pressure typically reduces residence time. Pressures may be controlled via a valve on the flue gas line. Pressure control of bed solids flow (and the resulting mass transfer rates) may be used to control residence time within the stages (e.g., in a pretreatment stage prior to a combustion stage).

A combustion stage may include a second fuel inlet 336 (e.g., to supplement the fuel value of the char), which may include a separate (or the same) fuel supply, typically with its own lock hopper. Second fuel inlet 336 may be the main fuel supply for the combustion stage, with a separate fuel supply implemented for the volatilization stage (e.g., as a retrofit to an existing combustion stage).

The hot flue gas from the combustion stage is typically used to generate steam, heat, energy. A portion of the hot flue gas may be routed through one or more optional heat exchanger 340 to preheat fluidization gas (e.g., flowing into the first stage). Heat exchanger 340 may extract heat from the exhaust gas and transfer the heat to the gas supplied to a stage (in this case, the volatilization stage), which may improve energy efficiency. Heat may be exchanged directly or indirectly (e.g., via a steam network extracting heat from the flue gas and/or volatiles gas and heating the fluidization gas). A heat exchanger may couple (directly or indirectly) a LowOx gas supply 311 to a hotter gas to preheat the LowOx gas supply prior to fluidization. A heat exchanger may couple the LowOx gas supply to a volatiles stream outlet 318 and/or an exhaust gas outlet 337 to transfer heat from the volatiles/exhaust gas to the inert/less oxidizing gas used to fluidize a stage (e.g., a volatilization stage).

Increased gas pressure in the one stage may increase the transfer of bed material into the other stage. Typically, some natural convection of the bed material recirculates at least some media between stages; pressure may affect this convection. FIG. 3A illustrates an implementation in which the floor heights of the two stages are the same; the floor heights may be different, stepped, and/or sloped, which may enhance flow using gravity. The volatilization stage may have an internal wall separating the fuel inlet 316 from the volatiles stream outlet 318. This wall may end above the fluidized bed height or descend into the bed (separating the respective gas phases). A baffle 620 (e.g., above a bed, within a bed, not shown) may be used to change direction and/or circulation (e.g., of drivenflow/returnflow) above or within the bed. The combustion stage may have an additional fuel supply 336. In some cases, a residual stream separated out of the volatiles stream by a separation reactor 221 is routed into the combustion stage 330, where it is burned.

Volatilization stage 310 may be operated to volatilize, gasify, pyrolyze, and/or otherwise partially react a fuel. Combustion stage 330 typically has a higher oxygen partial pressure than the volatilization stage, and is operated to combust matter that was not combusted by the volatilization stage.

Extraction of a combustible gas produced from a solid or liquid fuel may implement a single fluidized bed reactor having multiple stages. A combustion stage, where part of the cross section of the reactor vessel is fluidized with an oxidizing gas, may be preceded by a volatilization stage (fluidized with a less oxidizing gas), in which extraction and/or reaction is performed in a secondary reactor volume in which the fuel residence time is controlled by adjusting the pressure difference between the stages. Fluidization flow rates, a pressure difference between the stages (P1-P2) and/or the pressure drop relationships across a distributor plate and the fluidized bed (e.g., ((Pa2-P2)/(Pd1-Pa2)) and/or the distance between the distributor plate and the lower edge 302' of gaswall 302 volume may be controlled. In some embodiments, an extracted volatiles stream has a lower heating value higher than, including at least two times higher than, the average heating value of the total gas volume leaving the volatilization and combustion stages.

Gas inlets 314 and 334 may be separated by a nonfluidized region, which may be used to form a gaslock 304' having higher density than that of the fluidized beds on either side. A gaslock may reduce contamination of the gas phases, yet still allow a flow of bed solids. Reactor 300 may include a relatively thick gaswall 302 (e.g., as in FIGS. 3A, 3B, 7A, 7B, 8).

Figure 3B:
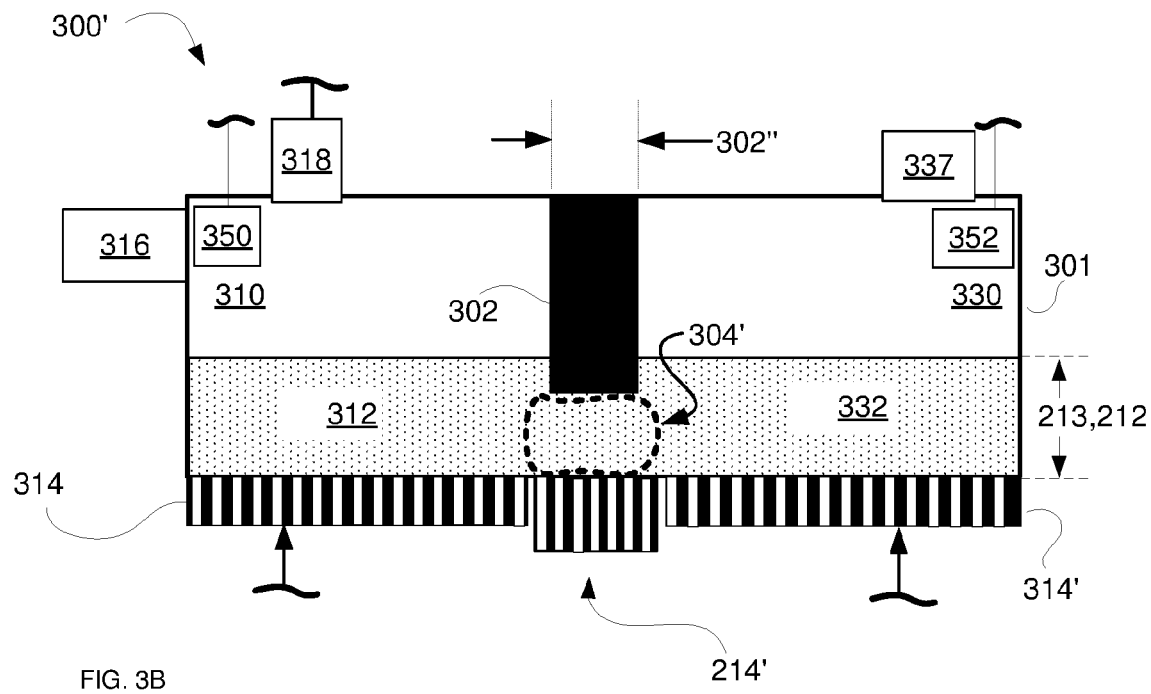
FIGS. 3B and 3C are schematic illustrations of a gaslock, per some embodiments.
Figure 3C:
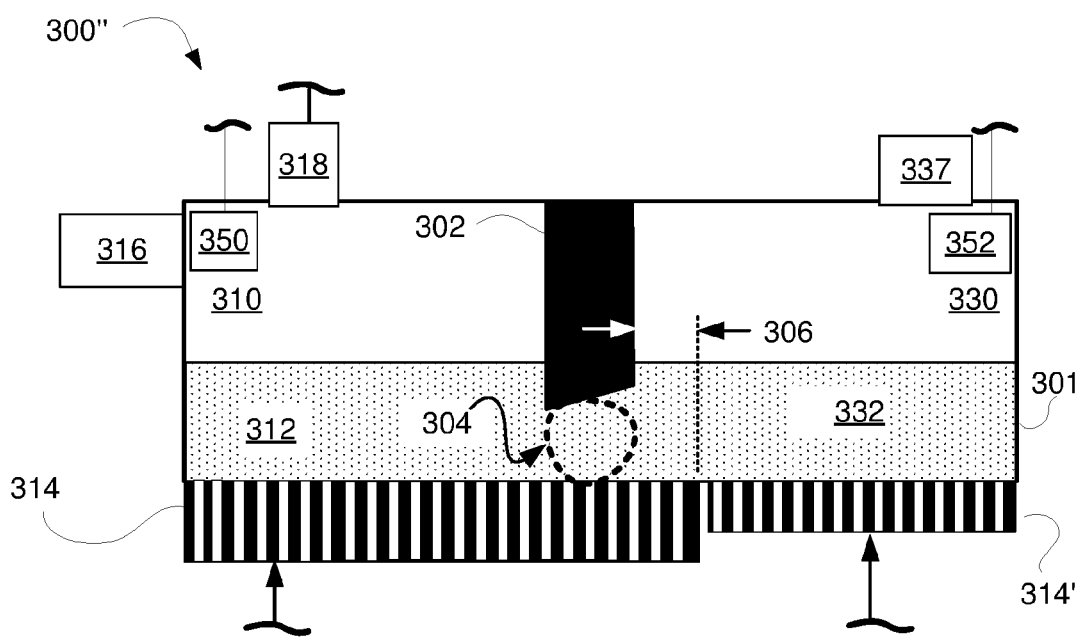

FIGS. 3B and 3C are schematic illustrations of a gaslock, per some embodiments. FIG. 3B illustrates a reactor 300' having a passage gas inlet 214' disposed between gas inlets 314/314'. Passage gas inlet 214' utilizes a passage gas, which may be the same or different (composition, temperature, velocity, and the like) as one/both of the gas inlets. A passage gas inlet may fluidize with a lower gas velocity than that of at least one fluidization gas inlet (e.g., to increase bed density to decrease gas contamination). A passage gas inlet may fluidize with a higher gas velocity (e.g., as a splash-generator), which may increase solids transport rates Passage gas inlet 214' is typically disposed beneath gaswall 302, and may extend beyond gaswall 302 by a distance 306 (FIG. 3C) in either direction.

A width 302" of a wall may be chosen according to a desired bed height and/or distance between lower edge 302' and the floor/inlet below. A typical width 302" is at least 10% of bed height, and may be up to 2× or even 3× bed height. A gaswall may have a thickness that is at least 20%, including at least 50%, including at least 100%, including at least 200%, of at least one expected fluidized bed height. For embodiments with a bedwall 303, a gaswall may have a thickness that is at least 10%, particularly not more than 100%, of a distance 307 between the bedwall and the gaswall (FIG. 4C). A relatively wider wall may facilitate internal cooling, which may be used to control heat transfer through the wall.

FIG. 3C is a schematic illustration of a gaslock in which a particular gas inlet extends beneath gaswall 302 into an adjacent stage. In some cases, a gas fluidizing one zone is particularly damaging to a reaction in another zone, while the converse might be less problematic. A volatilization reaction might be susceptible to contamination by small amounts of combustion gas, whereas a combustion reaction might be relatively tolerant of a small amount of volatilization gas. In such cases, a reactor 300" may comprise a gas inlet 314 (e.g., a LowOx gas inlet) that extends below wall 302, and may even extend a distance 306 into stage 330 (e.g., a combustion stage). In certain cases, distance 306 may be at least 10%, including at least 30%, including at least 50% of a thickness 302" of gaswall 302. Leakage of gas from gas inlet 314 (via distance 306) is typically undesirable (e.g., steam loss into a combustion stage), and so distance 306 is typically less than 2×, including less than thickness 302". Distance 306 may be from 10% to 50% of thickness 302". A LowOx gas inlet may extend beneath the gaswall (e.g., into the combustion stage), including by a distance 306 beyond the gaswall 302 that is at least 10%, including at least 20%, including at least 50% of at least one expected fluidized bed height. Such a geometry may reduce contamination of volatilization zone 310 by combustion gas from gas inlet 314'. An angled bottom surface may preferentially direct gas beneath gaswall 302 toward the stage where it is least harmful (e.g., a combustion stage 330). An angled top surface of a bedwall may preferentially direct solids in a desired direction (via gravity). A gaswall may have a bottom surface having an upper portion disposed proximate a HiOx reaction zone and a lower portion disposed proximate a LowOx reaction zone, such that gas rises toward the HiOx reaction zone. A bedwall may have a top surface with an upper portion proximate a LowOx reaction zone, such that bed solids flow toward a HiOx reaction zone.

Figure 3D:
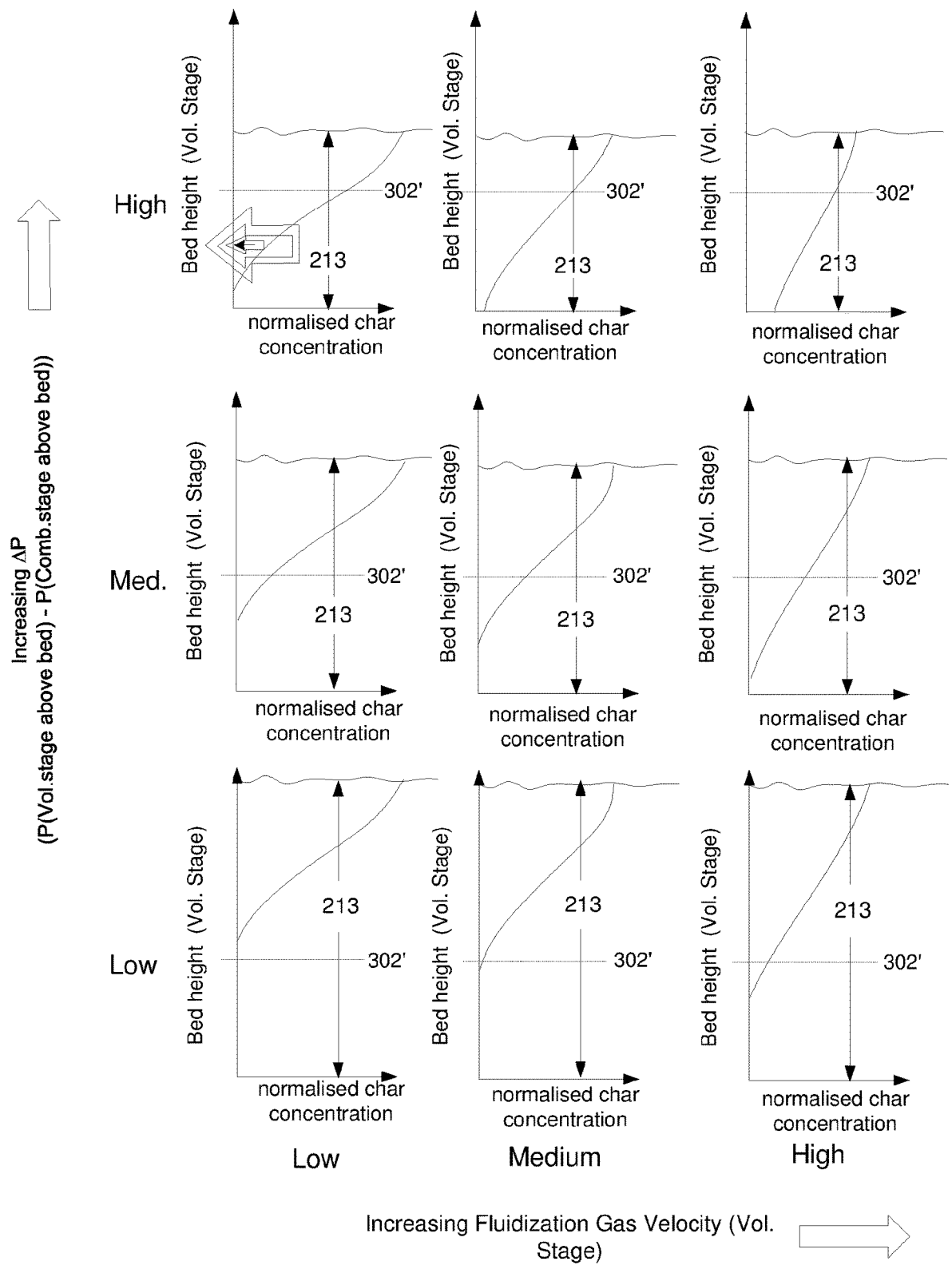
FIG. 3D is a schematic illustration of some effects of varying different control parameters, per some embodiments.

FIG. 3D is a schematic illustration of some effects of varying different control parameters, per some embodiments. For a given height of the lower edge 302' of gaswall 302 (e.g., a particular cross sectional area providing for a flow of bed solids between stages), FIG. 3D illustrates exemplary effects of changing pressure difference between stages (vertical) and changing fluidization gas velocity in a stage (horizontal). The top, middle, and bottom rows illustrate high, medium, and low pressure difference (Pvolatilization-Pcombustion), wherein higher pressure difference reduces volatilization bed height and lower pressure difference increases volatilization bed height. The left, middle, and right columns illustrate low, medium, and high gas fluidization velocity (or pressure drop across distributor plate), wherein higher velocity increases vertical bed homogeneity and lower velocity tends to segregate char toward the top of the bed.

The different schematics illustrate how bed height in the volatilization changes and how normalized char concentration in the volatilization stage changes. By controlling pressure difference and fluidization gas velocity, the relative char concentration at opening 304 (FIG. 3A) below lower edge 302' changes. Reaction rate within the bed may be controlled independently of the rate at which char flows to the adjacent bed.

Such multidimensional control may enable a decoupling of heat transfer between zones and residence time in each zone. A desired bed temperature may be maintained, yet the residence time may still be controlled to a desired value. Char homogeneity within the volatilization stage may be controlled independent of solids flow to the combustion stage, which may facilitate the extraction of high-value chemicals from a fuel. A desired minimum residence time in the bed may be achieved without requiring that the fuel reside "too long" in the volatilization stage.

A splashgenerator may provide an additional dimension of control. The upper left schematic of FIG. 3D illustrates different sized arrows, wherein arrow size corresponds to the magnitude of splashgenerator-induced drivenflow from the volatilization stage to the combustion stage. As shown by the different sized arrows, the magnitude of the "driving force" to flow bed solids/char beneath lower edge 302' can be controlled independently of pressure difference between stages and fluidization gas rate. Drivenflow may be used to control heat flux between reaction zones, independent of residence time and/or bed homogeneity within a stage. Such control may be particularly advantageous for extracting fragile, short-lived chemicals from a fuel prior to their decomposition and/or combustion.

Figure 4A:
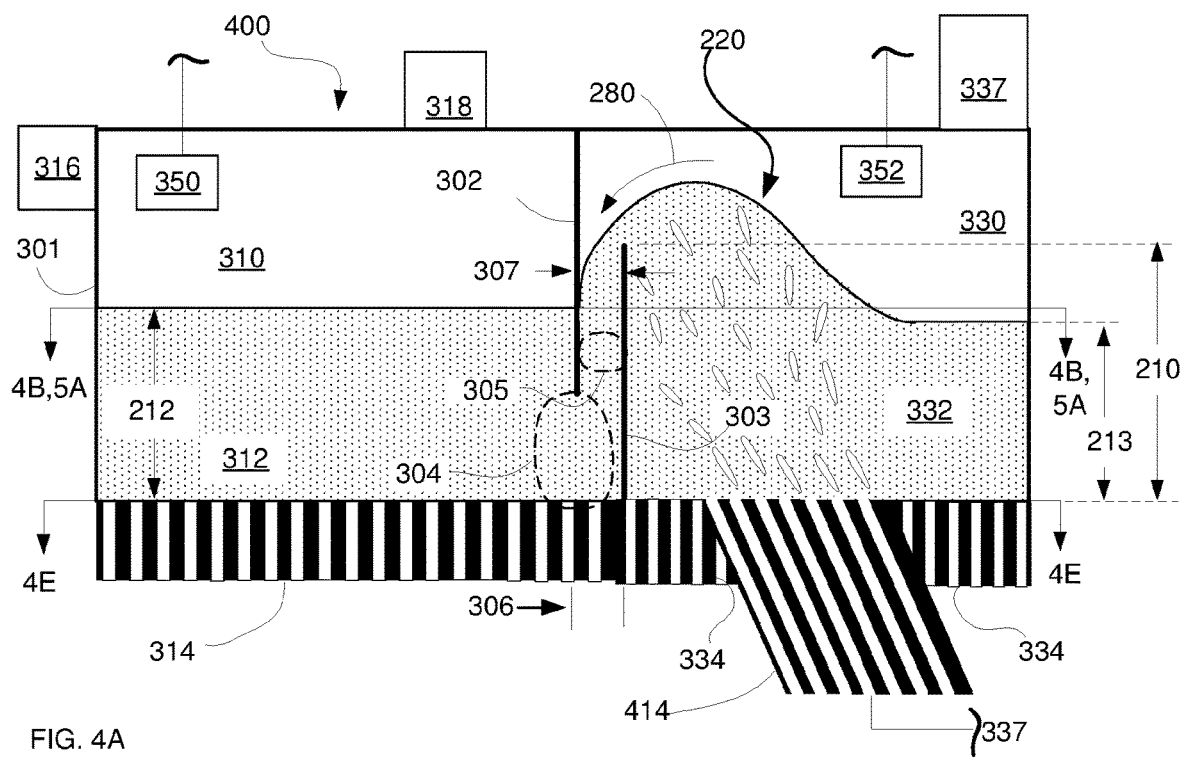
FIGS. 4A-F are schematic illustrations of different views of some embodiments.
Figure 4B:
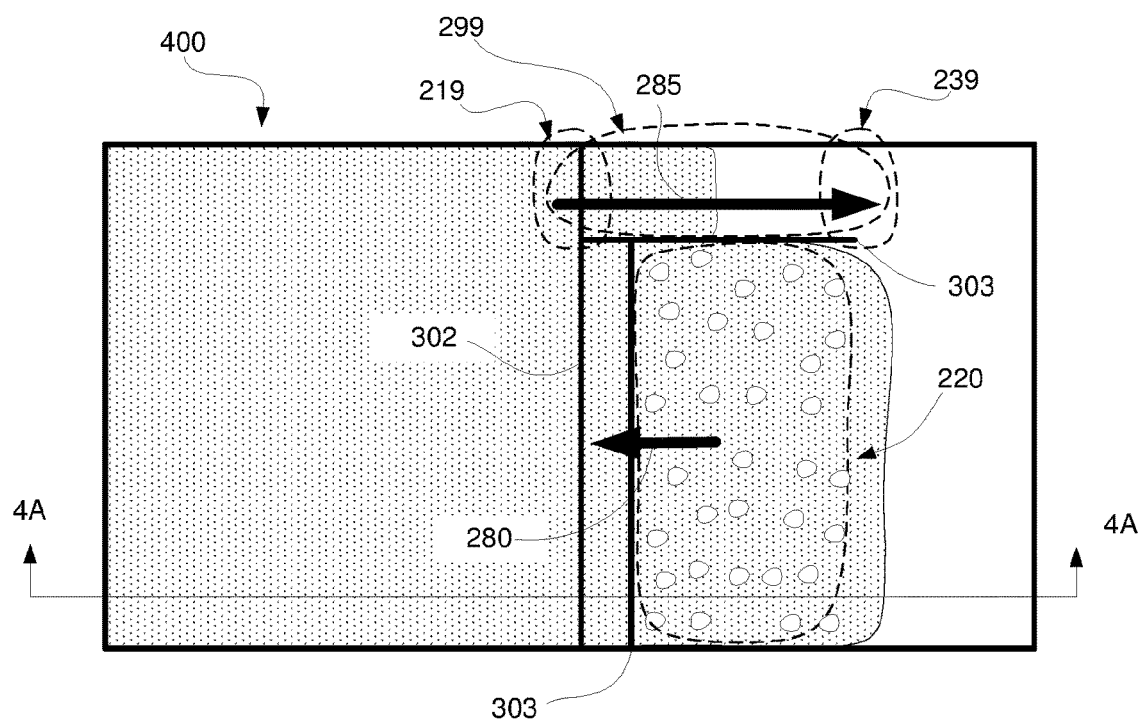
Figure 4C:
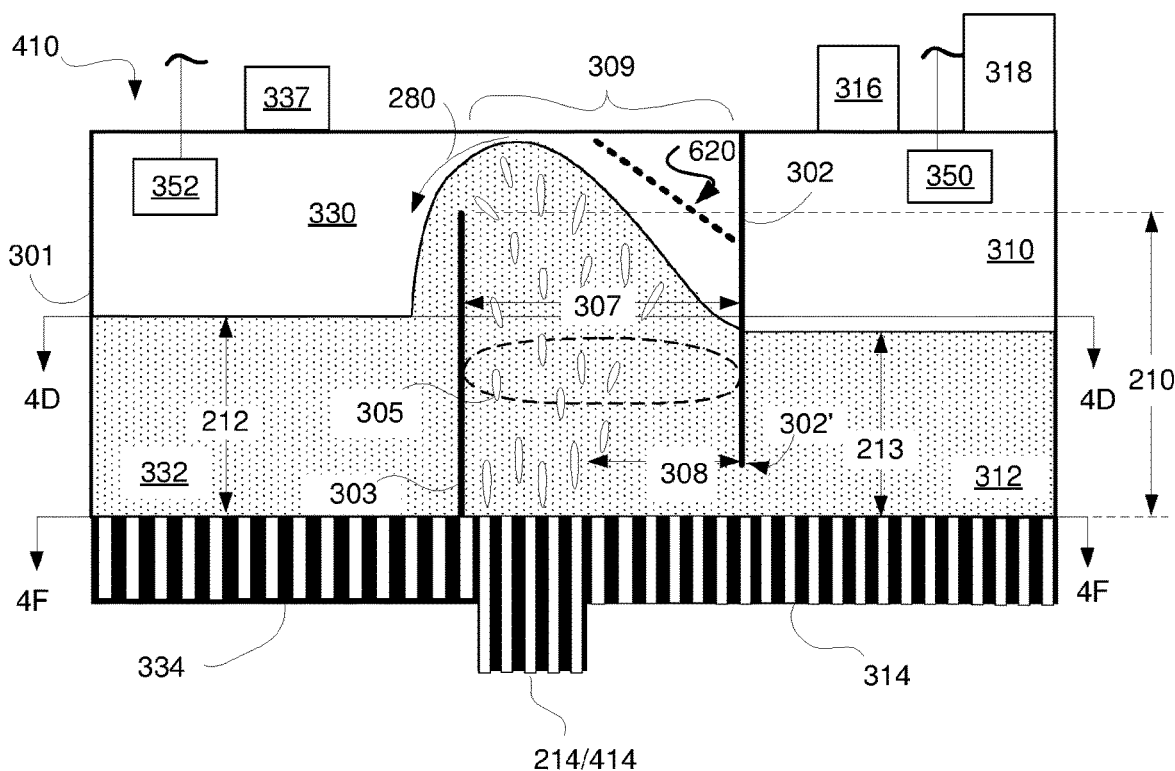
Figure 4D:
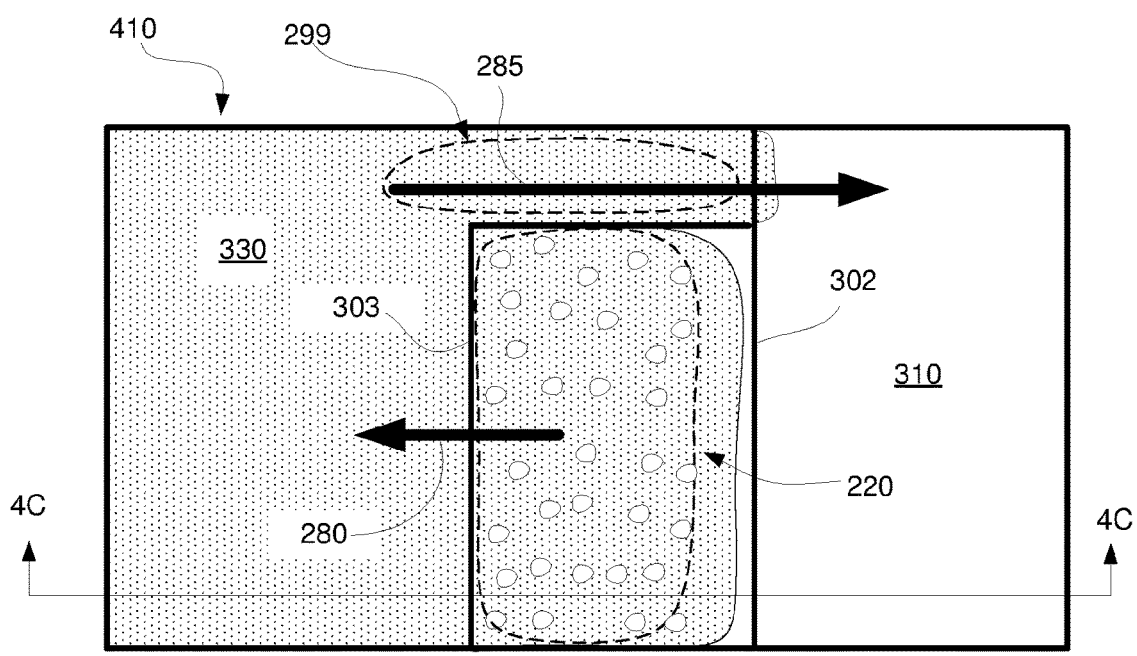
Figure 4E:
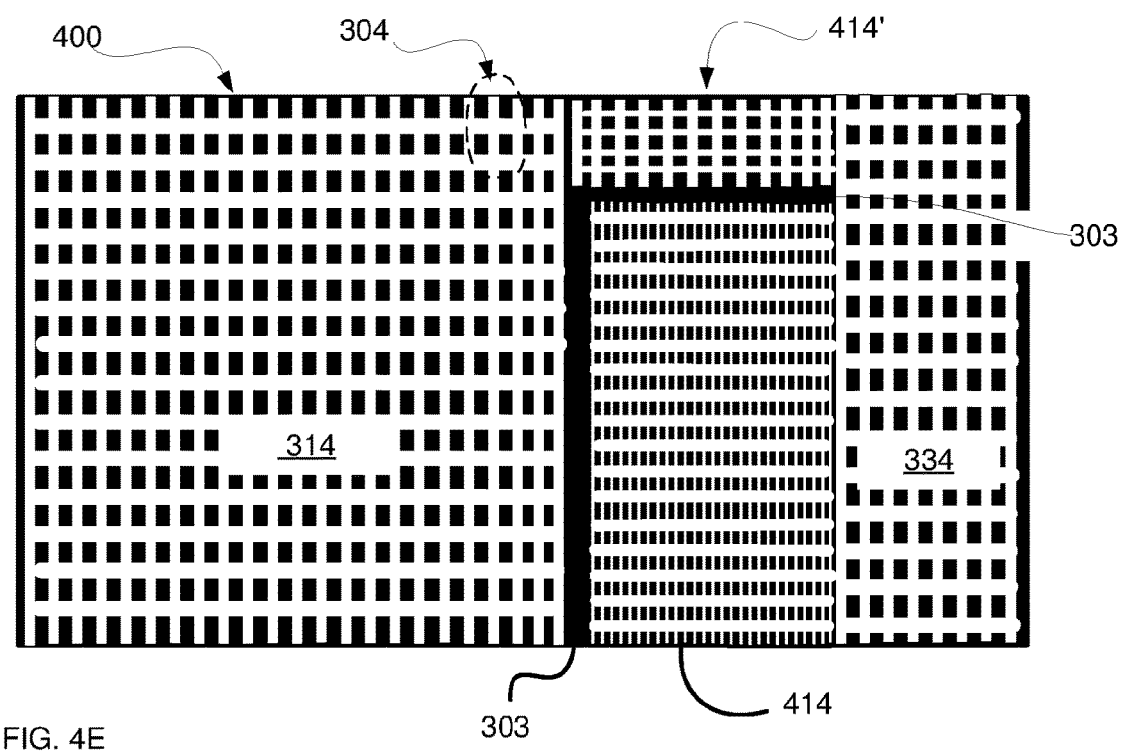
Figure 4F:
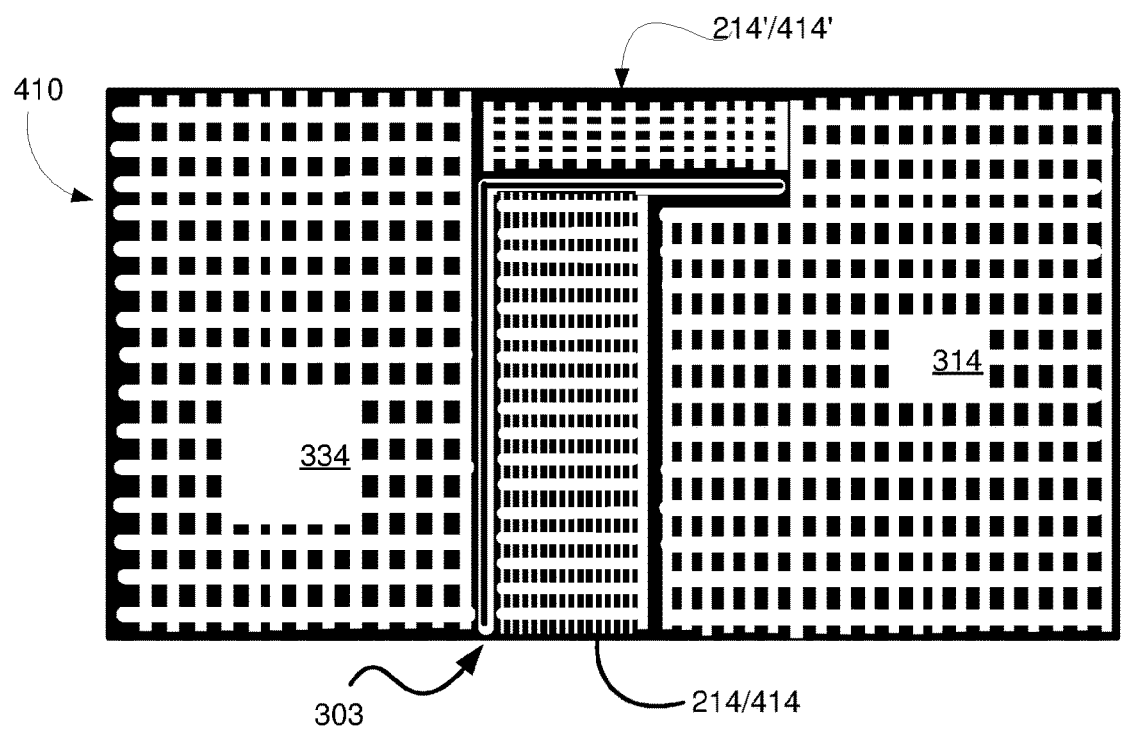

FIGS. 4A-F are schematic illustrations of different views of various embodiments. FIGS. 4A-F illustrate a splashgenerator in combination with pressure gauges and a pressure control means (not shown); pressure need not be controlled in some cases. FIGS. 4A, 4B, and 4E illustrate a reactor 400 in which an angled splashgenerator 414 is disposed in a combustion stage 330. FIGS. 4C, 4D, and 4F illustrate a reactor 410 in which a splashgenerator is disposed on the opposite side of a bedwall 303 than the combustion gas inlet 334. A passage gas inlet (e.g., incorporating aligned high momentum nozzles and/or a splashgenerator) may be implemented to facilitate bed transport control. Reactors are shown with thin walls, but they may include thick walls and/or with gaslocks. These figures illustrate the combination of a splashgenerator-controlled solids flow between reaction zones 312/332 separated by a bedwall 303 (e.g., as in reactor 200) with separate reaction stages 310/330 separated by a gaswall 302, each having its own fluidization gas (e.g., as in reactor 300). One stage has the first gas inlet, the other stage has the second gas inlet, and a wall separates the gas phases above the stages. Various gaps/openings/passages provide for drivenflow/returnflow between the stages. For simplicity, the stages are described as volatilization and combustion stages; fluidization gas composition may be chosen independently of splashgenerator location and/or transport gas.

Container 301 includes a bedwall 303 at least partially separating (in this case, substantially entirely separating) the bed solids into first and second reaction zones 312/332, and a gaswall 302 that separates at least the gas phases above the corresponding volatilization and combustion stages 310, 330. An opening 304 in/below the gaswall 302 provides for solids flow between the stages while blocking gas flow. In this example, height 210 of bedwall 303 is higher than the normally fluidized bed heights of both zones 312/332, and fuel inlet 316 delivers fuel to the first reaction zone 312/volatilization stage 310. The gap/opening 304/305 and passage 299 (FIG. 4B/D) provide for the circulation of bed solids between the reaction zones while the gases remain substantially independent. The first reaction zone may be operated as a volatilization stage (with a relatively less oxidizing gas, including an inert gas) and the second reaction zone may be operated as a combustion stage (with a more oxidizing gas). The drivenflow 280 of solids from the combustion stage and returnflow 285 of solids from the volatilization stage (or vice versa) may be used to circulate solids from the combustion stage to the volatilization stage and back again, while gaswall 302 enables separate atmospheres, pressures, and the like of the two stages. Typically, bedwall 303 separates at least a portion of the beds (but not the gases) and gaswall 302 substantially separates the gas phases (but not the beds).

FIG. 4A illustrates a side view in cross section. In reactor 400, container 301 containing the bed of bed solids includes at least two walls 302, 303. Bedwall 303 separates at least a portion of the bed into a first reaction zone 312 configured to operate as a first stage 310 comprising the first gas inlet 314 and a second reaction zone 332 configured to operate as a second stage 330 and comprising the second gas inlet (314', 334), each gas inlet fluidizing with its own gas. A gap 305 at least partially defined by a distance 307 between the first and second walls (302, 303) provides for a flow of drivenflow 280 of bed solids from the second stage to the first stage. The region between walls (e.g., gap 305) may comprise a transport chamber that transports bed solids and char between stages. In this example, the transport chamber is fluidized by gas inlet 314 (i.e., the region is to the left of bedwall 303) but shares an ambient gas above with the stage 330 (i.e., the region is to the right of gaswall 302). A passage 299 (FIG. 4B) provides for the returnflow 285 of bed solids from the first stage to the second stage. In this example, bedwall 303 has a height 210 that extends above the "normally fluidized" bed heights (212, 213, FIG. 2A) of the zones, such that the beds are separated except for drivenflow 280 and returnflow 285 (FIG. 4B).

A volatilization stage 310 may include at least a majority (typically substantially all) of the first reaction zone 312, and a combustion stage 330 may include at least a majority of (e.g., substantially all) of the second reaction zone 332. Gaswall 302 separates the gaseous phase in the volatilization stage 310 (first reaction zone 312) from that of the combustion stage 330 (second reaction zone 332). An opening 304 through and/or below the gaswall 302 and below the expected bed height is configured to provide for a flow of the drivenflow 280 (e.g., bed solids and char stream) from the combustion stage 330 to the volatilization stage 310, having been driven past bedwall 303 by the splashgenerator, but substantially prevents gaseous communication between the reaction zones.

As combustion is typically exothermic, a splashgenerator may be used to transfer heat from the combustion stage to the volatilization stage, which may reduce the need for gas preheating in the volatilization stage. Typically, the combustion stage is hotter than the volatilization stage, and so control of the splashgenerator-induced momentum may be used to control heat transfer from the combustion stage to the volatilization stage via control of the drivenflow 280 of solids. Such a configuration may also be used to "additionally volatilize" the char, such that slow reactions may completed on a "second lap" through the volatilization stage. A passage 299 (FIG. 4B) provides for the returnflow 285 of bed solids from the volatilization stage to the combustion stage when the splashgenerator is operating.

The gaswall 302 may be disposed in either reaction zone, including within the first reaction zone 312 (e.g., proximate to bedwall 303) or second reaction zone 332. With respect to bedwall 303, the splashgenerator may be disposed in either reaction zone, including 332 (FIG. 4A) and/or 312 FIG. 4C). Drivenflow of solids may be facilitated by locating the splashgenerator in one zone and the gas-blocking gaswall 302 in the other zone, such that drivenflow 280 splashes against the second wall and drops into the gap 305 between the walls. Typically, gaswall 302 is located proximate bedwall 303 (e.g., within a distance that is less than 20%, including less than 10%, including less than 5%, of the length of first reaction zone 312 (left to right in FIG. 4A)). When walls 302/303 are separate walls, a gap 305 between the first and second walls 302/303 may provide for a flow of the drivenflow 280 of bed solids from the combustion stage 330/second reaction zone 332 past bedwall 303, through gap 305, through opening 304, into the volatilization stage 310/first reaction zone 312. The gap may include a region having the gas phase of one zone (e.g., combustion stage) and the fluidization gas of the other zone (e.g., the volatilization stage), and so the size of the gap may be minimized according to an expected flow rate of drivenflow. A vertical distance from a lower edge 302' of gaswall 302 to the gas inlet below is typically less than the bed height 213, including 30%-95%, including 40-90%, including 50-80% of the bed height. A typical bed height may be 40-60, including 50-55 cm. A vertical distance from a lower edge 302' of gaswall 302 to the gas inlet below may be from 20-50, including form 30-40 cm.

Gas inlet 314 at the bottom of the bed in first reaction zone 312 may be coupled to a LowOx gas supply and configured to deliver a first LowOx (relatively less oxidizing/inert) gas to fluidize the bed solids in the first reaction zone 312 for use of this stage as a volatilization stage. Gas inlet 334 may be an oxidant inlet 334 at the bottom of the bed in the second reaction zone 332 that is coupled to a HiOx gas supply and configured to deliver a second HiOx gas that is relatively more oxidizing than the LowOx gas to fluidize the bed of bed solids in the second reaction zone, which may be operated as a combustion stage. For example, the LowOx gas might be steam, syngas, N2, and/or CO2, and the HiOx gas might be CO2, air and/or oxygen. In FIG. 4A, gas inlet 314 (e.g., with a less oxidizing gas) extends beneath gap 305, and the ambient above gap 305 includes the combustion stage 330 (having a more oxidizing gas). Solids may flow through gap 305 while the gas inlets 314/334 and corresponding gases of stages 310/330 remain separated.

Splashgenerator 414 imparts a localized directed momentum to the bed solids in the second reaction zone 332 to create a drivenflow 280 of solids past bedwall 303 into first reaction zone 312, driving solids from the combustion stage to the volatilization stage. In this example, splashgenerator 414 is configured to generate a momentum that is at least partially horizontal, in this case angled toward the top of bedwall 303. The momentum may be directed away from an opening below a gaswall (e.g., an opening on the same side of the bedwall as the splashgenerator). A splashgenerator may comprise angled jets configured to inject high velocity gas toward the top of the wall. A splashgenerator may inject a transport gas that is more or less oxidizing than that delivered by gas inlet 314, which may be the same or different as that delivered by oxidant inlet 334. The transport gas may include flue gas and/or steam.

FIG. 4B illustrates an overhead of a section of reactor 400, showing the passage 299 through which bed solids return (through and/or beneath gaswall 302, beneath the bed heights) from the first reaction zone 312 (volatilization stage) back to the second reaction zone 332 (combustion stage). The returnflow 285 of bed solids "returns" the solids driven by drivenflow 280, enabling circulation of solids between separate reaction zones of a single fluidized bed, and thus between stages. Flow of solids past bedwall 303 (drivenflow 280 driven by splashgenerator 414) and corresponding returnflow 285 of the solids provides for a compact "circulation" of solids from the combustion stage to the volatilization stage and back again. With this compact design, heat generated by combustion in the combustion stage may be efficiently transferred back to the volatilization stage, where it may be used to enable reactions in the volatilization stage. Having released its heat, these solids return to the combustion stage via returnflow 285.

In reactor 400, a char stream outlet 219 from the volatilization stage and char stream inlet 239 into the combustion stage are schematically illustrated as parts of passage 299, illustrating a flow of char (as part of returnflow 285) from the volatilization stage to the combustion stage. The char is typically burned in the combustion stage, and the heat (transferred as drivenflow 280) is then used in the volatilization stage.

FIG. 4E illustrates an overhead view of another section of reactor 400, schematically illustrating the "bottoms" of the relevant zones of the bed. The different gas inlets (314, 334) fluidize their respective zones/stages, and a passage gas inlet 414' (in this case angled) fluidizes the returnflow 285 of solids (FIG. 4B) returning from first reaction zone 312/volatilization stage 310 to second reaction zone 332/combustion stage 330 (FIG. 4A). Passage gas inlet 414' may fluidize the solids in the passage with the same gas or different gas than that used in either of the reaction zones. A passage gas inlet 414' may use a gas that is more, less, or equally oxidizing than the gas delivered by the first gas inlet 314, which may or may not be the same gas as that delivered by oxidant inlet 334 to fluidize the second reaction zone 332.

The returnflow passage is typically dimensioned to accommodate an expected flow rate of the drivenflow past the wall without deleterious backpressure. The "natural" back-convection through the passage may be minimized by having a relatively long, narrow passage. A passage may have a length greater than its width, including 2× the width, including 5× the width, including 10× the width. Natural convection between the zones (splashgenerator turned off but gas inlets fluidizing their respective zones) may be controlled (e.g., minimized) via passage shape, dimensions, and the like.

FIG. 4C illustrates a reactor 410 in which a combustion stage 330 receives drivenflow from a volatilization stage 310, which may be advantageous when the volatilization gas carried with the drivenflow is less harmful to the combustion stage than combustion gas to the volatilization stage. In this example, the splashgenerator 214/414 is on the opposite side of bedwall 303 than the oxidant inlet 334, and (in this case) adjacent to LowOx gas inlet 314. The walls are separated by a distance 307 to form a transport chamber 309, with the splashgenerator disposed between the walls. Distance 307 is typically at least 10% of bed height and less than 3×, including less than 2×, including less than bed height, including less than 50% of bed height.

By locating the splashgenerator between the walls, splash energy may be focused and enhanced for long-range transport (rather than short-range dispersion or convection). In this example, a bottom of the transport chamber comprises the gas inlet of one stage (e.g., volatilization) beneath the atmosphere of the other stage (e.g., combustion). Drivenflow 280 transfers solids through gap 305 while the gas phases on either side of gaswall 302 remain separated. The splash-containment of a transport chamber may enable the use of reversing or non-directing nozzles, which may improve sand-tolerance of the nozzles.

Figure 6:
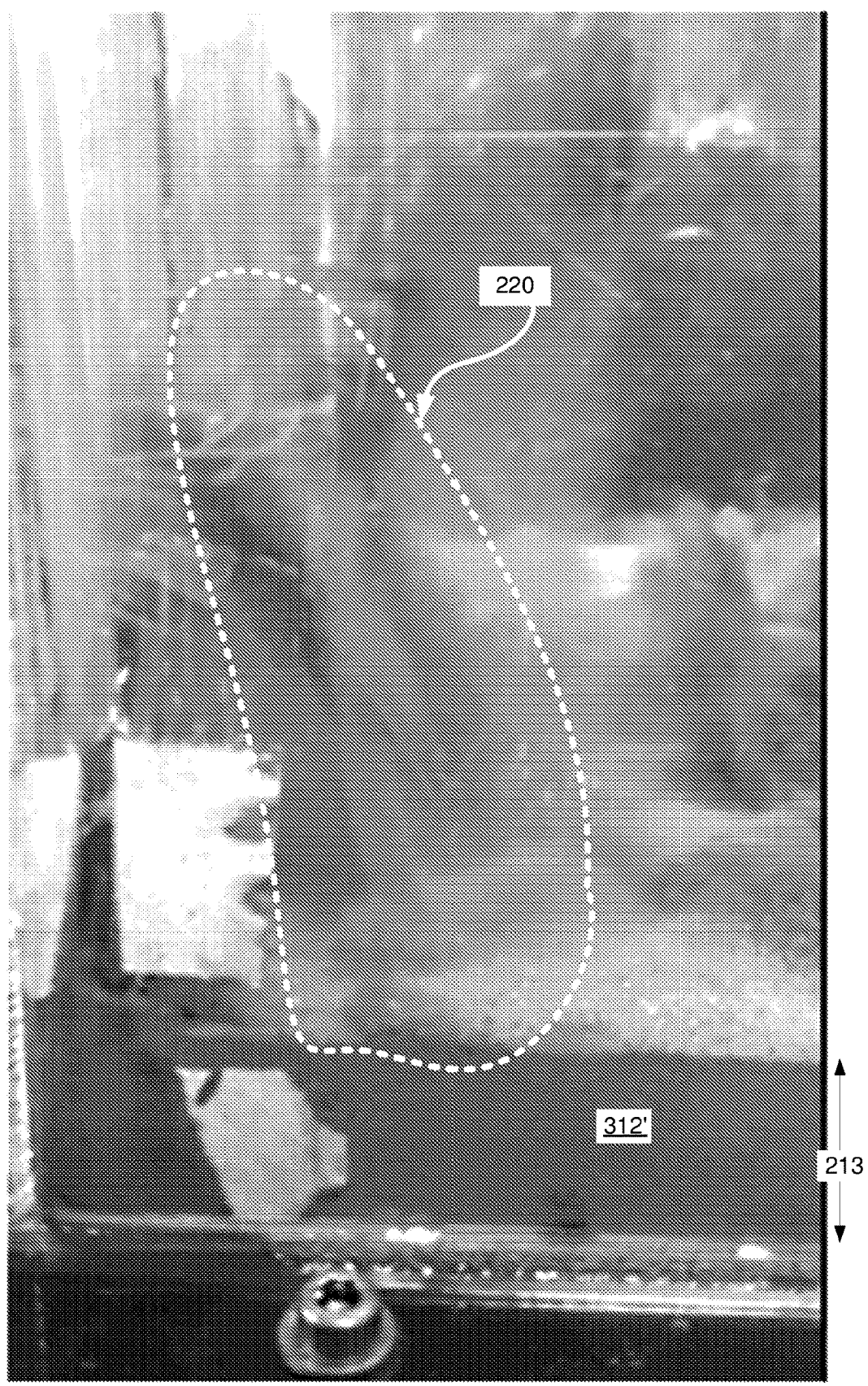
FIG. 6 is a photograph of an experimental fluidized bed having a reaction zone comprising a splash generator (not shown) comprising directed, high-momentum jets and configured to generate a splashzone, per some embodiments.

In this example, an optional baffle 620 substantially above the splashgenerator directs drivenflow toward the combustion stage, which may be advantageous for particularly high velocity splashes that "spray" through the top of the bed (e.g., FIG. 6). A baffle may extend from a gaswall into the combustion stage, particularly at an upward angle or downward angle with respect to drivenflow direction. A baffle may have a trailing edge that constrains the transport chamber, leading to acceleration of the drivenflow (e.g., a "jet" effect).

A reactor may include a buffer distance 308 between the splashgenerator and the gaswall 302, which may be used to reduce the in-bed splashing "backwards" into the volatilization stage 310. Buffer distance 308 may include a non-fluidized region at the bottom of the container and/or a passage gas inlet (e.g., at low fluidization velocity) to increase local bed density between the splashgenerator and opening 304 (FIG. 3A). A buffer distance 308 may be 35-65%, including 40-55% of a distance 307 between walls. A buffer distance may be at least 5%, including least 20%, including at least 40%, including at least 60% of a height of the lower edge 302' above the relevant (e.g., LowOx) gas inlet 314.

FIG. 4D illustrates a top view of reactor 410, showing drivenflow 280 flowing from the volatilization stage 310 into the combustion stage 330, and returnflow 285 flowing beneath gaswall 302 back into the volatilization stage.

FIG. 4F illustrates exemplary gas inlets of reactor 410, including passage gas inlet 214'/414', which may be angled toward the volatilization stage (to enhance solids flow) or angled toward the combustion stage (to reduce combustion gas transfer of the volatilization stage).

Figure 5A:
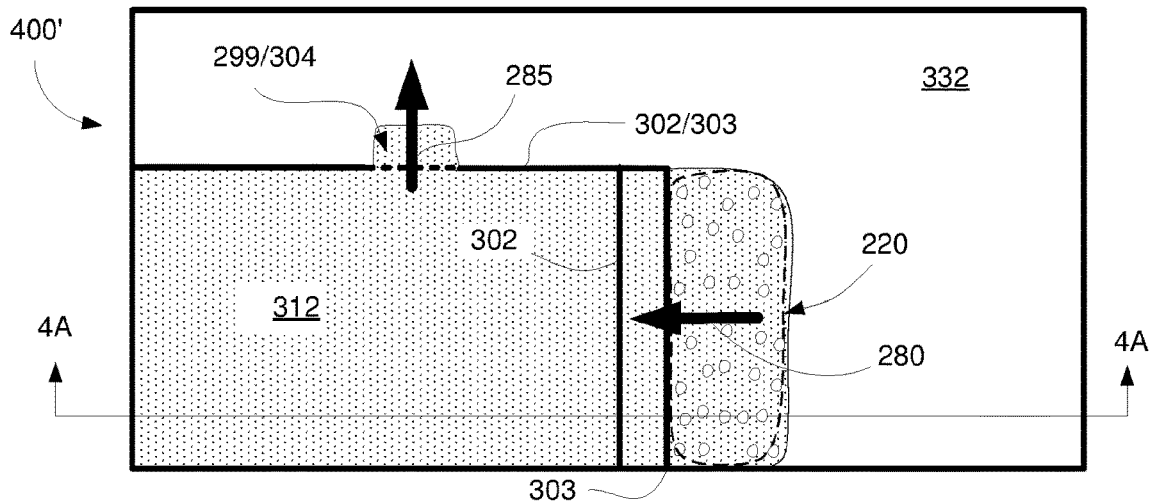
FIGS. 5A-C are schematic illustrations of surrounded reactors, per various embodiments.

FIG. 5A is a schematic illustration of an overhead view of a reactor 400' having a very short passage 299 between first and second reaction zones 312/332, per an embodiment. A passage 299 may essentially have zero length (e.g., be the thickness of a wall separating the reaction zones). Such a configuration may provide for a very fast transition from the fluidization gas/ambient atmosphere of the first reaction zone 312 to the fluidization gas/ambient atmosphere of the second reaction zone 332. For example, a first reaction zone 312 may be operated to have a much higher temperature than the second reaction zone 332 (e.g., using preheated gas). The splashgenerator and/or pressure control may be used to constrain the fuel entering the first reaction zone to a very short residence time, after which the fuel "quenches" to the temperature of second reaction zone 332 after having passed through opening 304 as returnflow 285. Such a configuration may be used to fractionate the fuel, quickly extracting highly volatile species before longer term degradation occurs.

In this example, reactor 400' comprises a combined wall 302/303 that separates both the gas phases (e.g., above volatilization and combustion stages, FIG. 4A) and the bed solids (of first zone 312 fluidized by a first gas and second zone 332 fluidized by a second gas). Passage 299 may comprise an opening 304 in wall 302/303 located below the fluidized bed surface that allows returnflow 285 to flow from the first to second reaction zone while the gas phases remain separated. Opening 304 may or may not extend to the reactor floor. Combined wall 302/303 may (but need not) have at least a bottom part of bedwall 303 separating the gas inlets 314/334/314' (FIG. 2C, 4E) and lowermost bed portions of the reaction zones.

The locations of the walls, splashgenerator, and passage/openings may be chosen to enhance circulation around the bed (from one zone to the other). A reactor (e.g., 400') may comprise a first reaction zone built into the second reaction zone (e.g., in a retrofit application). A reactor (e.g., a volatilization reactor) may be retrofit adjacent to an existing bed (e.g., an existing combustion reactor). FIG. 5A illustrates an embodiment in which the first reaction zone 312 (which may be a first stage) is at least partially surrounded by (including substantially contained within) the second reaction zone 332 (in this case, surrounded on two sides; it may be surrounded on three or more sides). As opposed to FIG. 4B (in which the returnflow direction is geometrically opposite the drivenflow direction), reactor 400' has returnflow 284 flowing in a direction other than opposite that of drivenflow 280 (in this case, about 90 degrees).

Figure 5B:
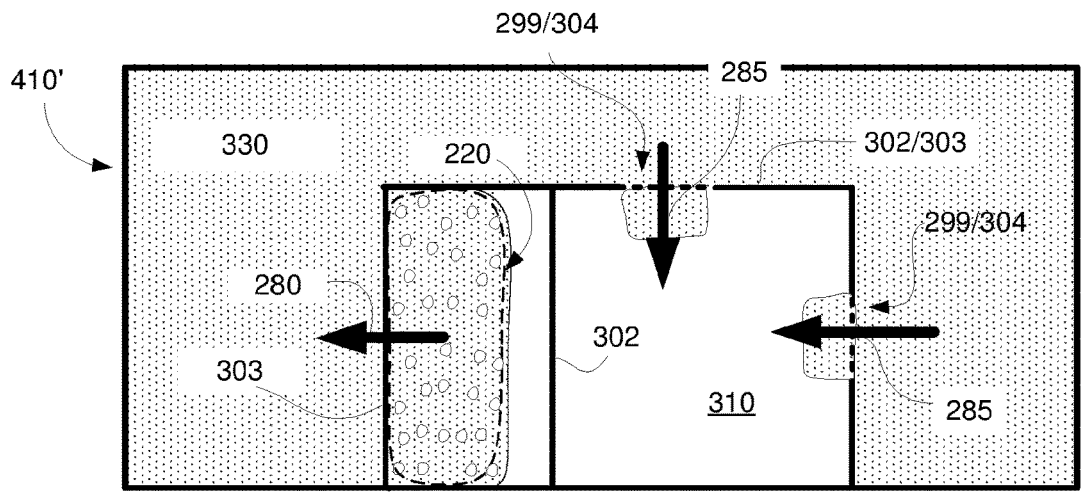
Figure 5C:
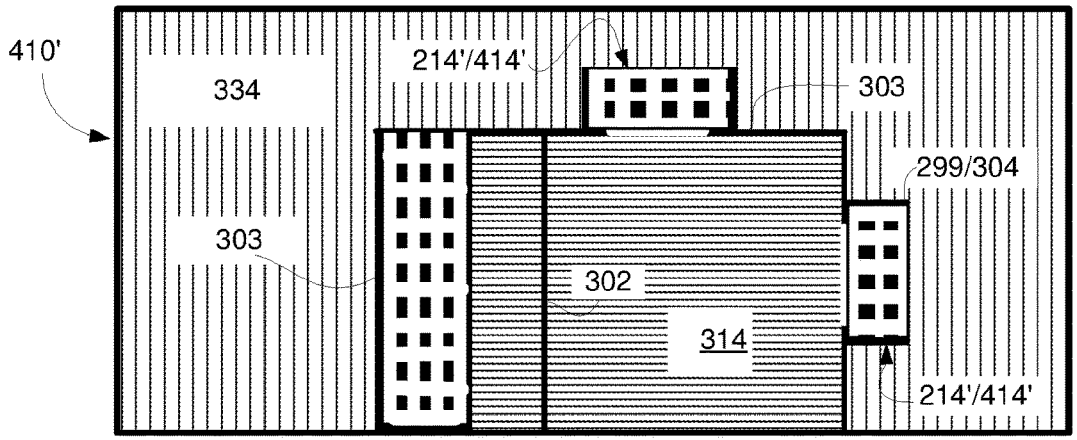

FIGS. 5B-5C illustrate a reactor 410' in which a HiOx reaction zone 332/combustion stage 330 surrounds a LowOx reaction zone 312/volatilization stage 310. In this example, the outer zone surrounds the inner zone on three sides. Such a configuration may facilitate heat transfer from a hotter outer zone (e.g., combustion) to the inner zone (e.g., volatilization). An opposite geometry (LowOx/volatilization surrounds HiOx/combustion) may also be used.

Figure 5D:
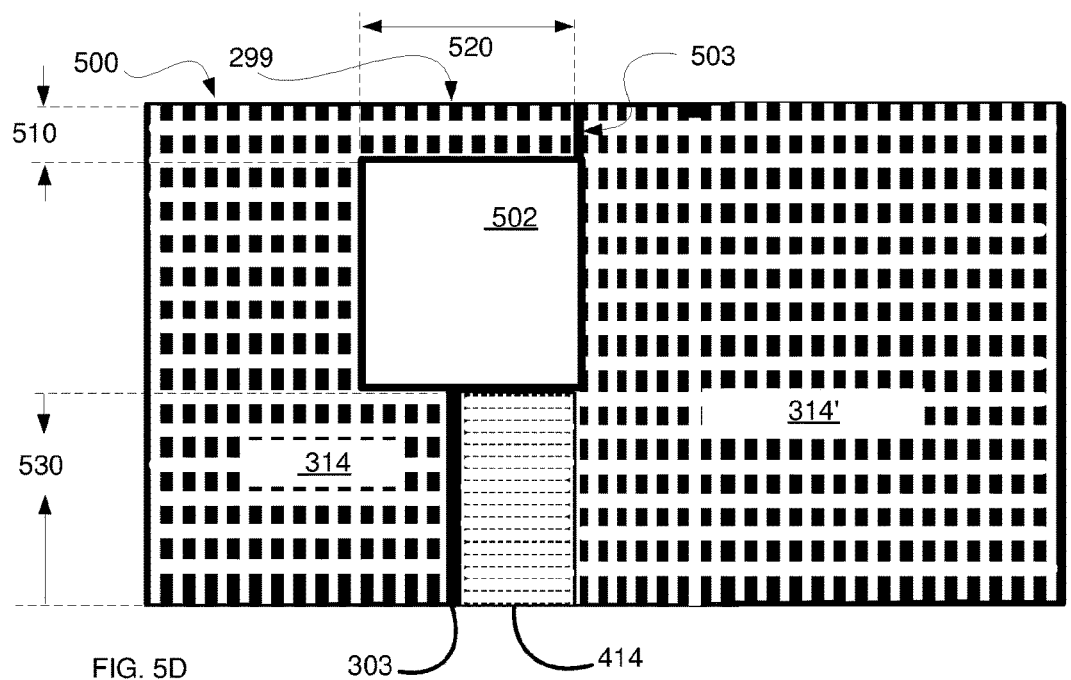
FIG. 5D illustrates various optional features, per an embodiment.

FIG. 5D illustrates various optional features, per an embodiment. According to the types of reactions in each zone, temperatures, gases, particle behavior, and the like, a reactor may be modified to enable certain types of flow. In some cases, an optional passage wall 503 separating at least a portion (e.g., at least the bottom) of the beds is used to minimize natural convective transport between zones. A passage wall 503 allows returnflow solids to flow over the passage wall 503 when the bed height in the first reaction zone 312 (FIG. 2A) exceeds the height of passage wall 503. As drivenflow 280 "loads" the first reaction zone 312 with solids, bed height increases until the solids can pass over passage wall 503 as returnflow 285 into second reaction zone 312' (FIG. 2A). A passage wall 503 may be at the leading end, trailing end, or within a passage. A passage width 510 and passage length 520 may be chosen according to a desired flow rate within the passage. In some cases, a breadth 530 of splashzone 220 (FIG. 2A) and an expected drivenflow rate are used to design an appropriate combination of passagewidth 510 and passagelength 520.

An optional Flow Directing Area (FDA) 502 may be incorporated into the container. An FDA is typically a large (as compared to a simple wall) volume through which material cannot pass. An FDA may be hollow and/or insulated. Blocking flow, the FDA forces material to take a longer route (e.g., from one zone/stage to the next). FDA 502 typically blocks both gas and solid flow. FDA 502 may be used to increase passage length 520 (for a given width).

FDA 502 may be used to force material to spend a minimum residence time in a given reaction zone before exiting that reaction zone. FDA 502 may be substantially "surrounded" by the beds and gas phases, such that heat loss to the external environment is minimized, notwithstanding the long circulation path within the container.

EXAMPLE 1

FIG. 6 is a photograph of an experimental fluidized bed having a $2^{nd}$ reaction zone 312' and a splash generator 214 (not shown) comprising high pressure jets and configured to generate a splashzone 220, according to some embodiments. As compared with the flow rates and volumes used in a CFB to move particles tens of meters, a relatively low momentum is still sufficient to splash the bubbling bed solids high enough over the normally fluidized bed height (e.g., 10% of the bed height above, 20% of the bed height above, 100% of the bed height above, twice the bed height above, or as illustrated here, approximately 300% of the bed height above). A short distance (e.g., <2m) is sufficient to move between zones, as opposed to the many meters of flow in a circulating "bed." Thus, a drivenflow 280 of solids may be easily controlled, notwithstanding a wall separating the beds extends above the bed height, using a small, localized injection of momentum to splash the solids over the wall. A splashzone may extend to at least twice, including at least 3× the fluidized bed height. As shown, splashgenerator velocities are typically much higher and aligned as compared to velocities that yield fluidization.

Figure 7A:
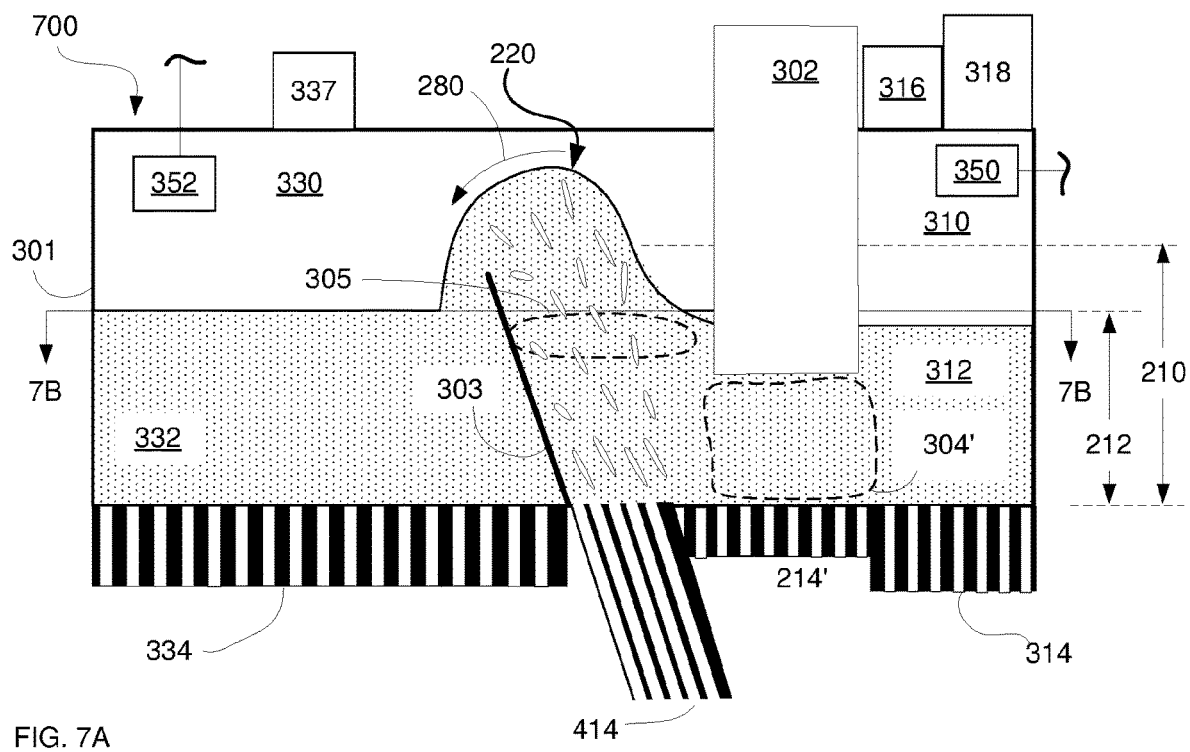
FIGS. 7A and 7B are schematic illustrations of different views of some embodiments.
Figure 7B:
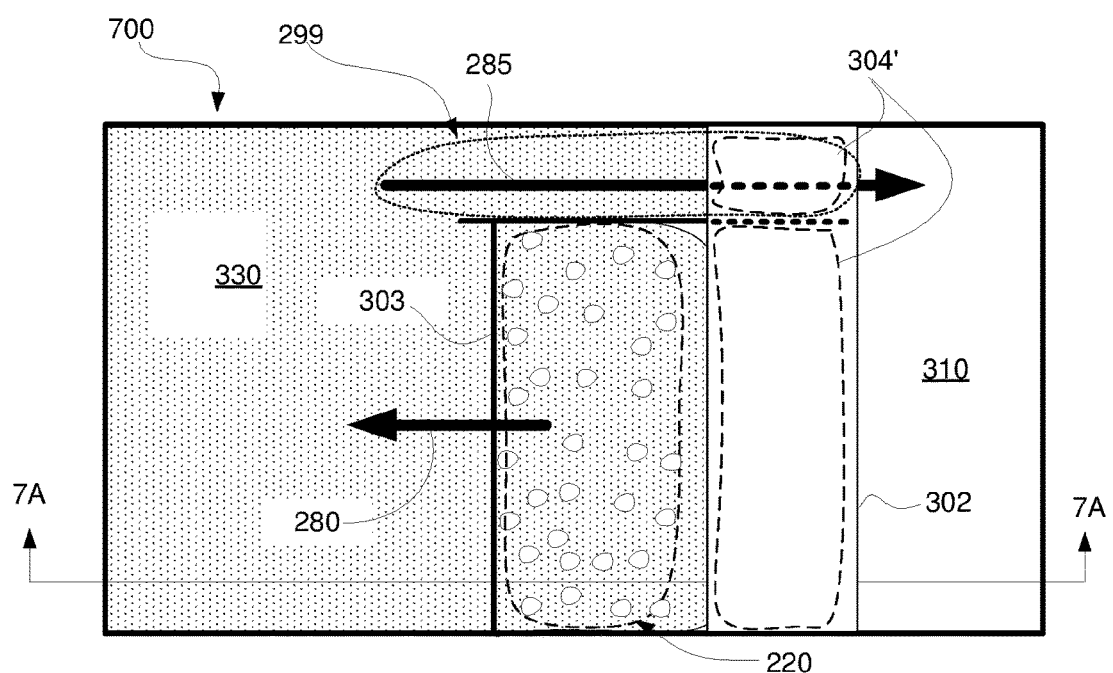

FIGS. 7A and 7B are schematic illustrations of different views of some embodiments. Reactor 700 illustrates an angled bedwall 303, which may direct drivenflow, particularly in combination with an angled splashgenerator 414. A relatively thick gaswall 302 may be combined with a passage gas inlet 214' configured to form a gaslock 304', which may reduce "backwards" transport of into reaction zone 312. A wider gaswall may enable a relatively larger distance of lower edge 302' of gaswall 302 above the passage gas inlet (e.g., less than 20%, including less than 10% of bed height), which may increase bed solids transport beneath the wall while still blocking gas transport. A reactor may comprise a passage gas inlet disposed between a LowOx gas inlet and an oxidant inlet (e.g. substantially beneath the gaswall). The passage gas inlet may be configured to fluidize a portion of the bed to form a gaslock (304') using a passage gas having a different composition, pressure, and/or flow rate than that of at least one of the LowOx gas inlet and oxidant inlet, particularly with the inert and/or less-oxidizing gas at a lower flow rate than that of the LowOx gas inlet.

Figure 8:
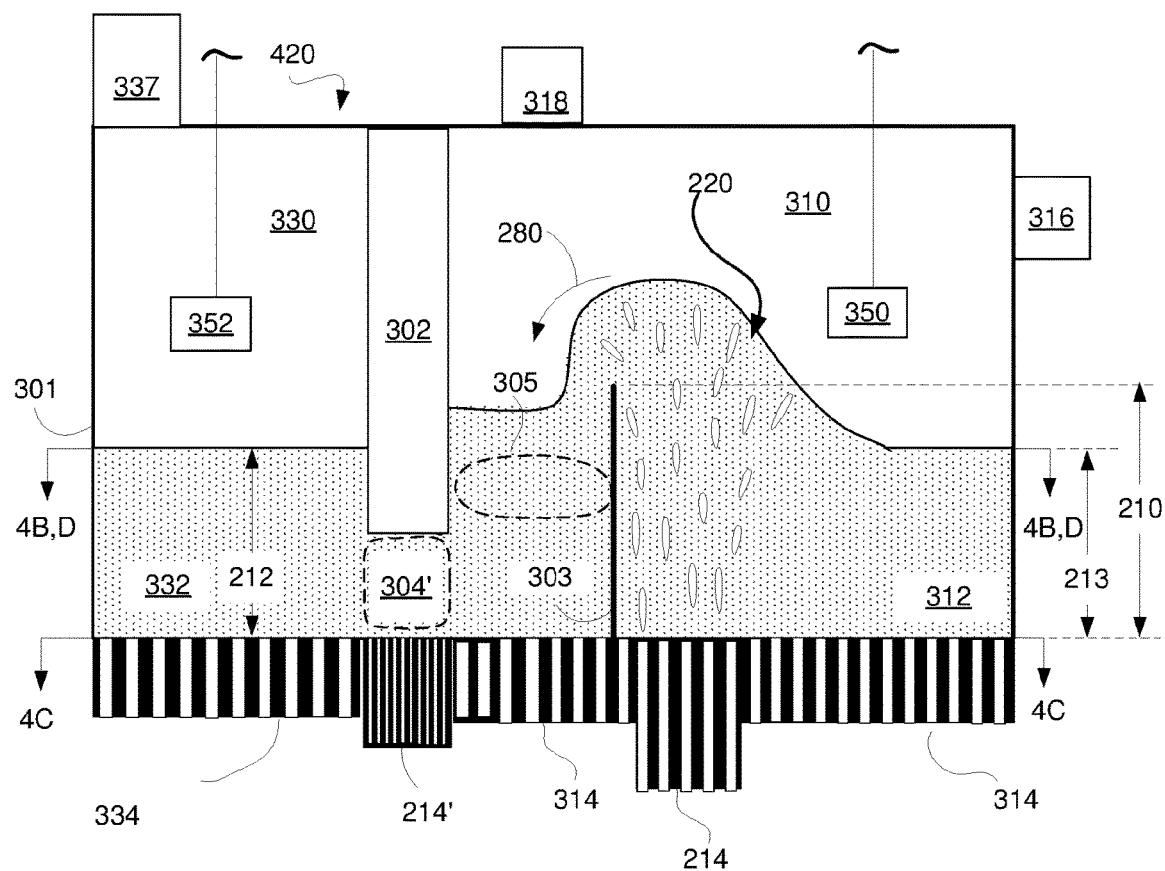
FIG. 8 is a schematic illustration of a reactor per some embodiments.

FIG. 8 is a schematic illustration of a reactor per some embodiment. Reactor 420 may comprise a splashgenerator 214 disposed entirely within the volatilization stage 310. In this example, gaswall 302 is on one side of bedwall 303 and splashgenerator 214 is on the opposite side. Such a configuration (splashing upward into the volatilization stage) may be advantageous when large char particles tend to float in the volatilization stage for long times. An optional gaslock 304' is illustrated, which may reduce the contamination between an oxidant inlet 334 (to the left) and a LowOx gas inlet 314 (to the right).

Various features described herein may be implemented independently and/or in combination with each other. An explicit combination of features in an embodiment does not preclude the omission of any of these features from other embodiments. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. A fluidized bed reactor configured to react a fuel in a fluidized bed of bed solids, the reactor comprising:
 a bedwall configured to separate at least a portion of the fluidized bed of bed solids into:
  a LowOx reaction zone comprising:
   a LowOx gas inlet configured to fluidize at least a first portion of the bed solids within the LowOx reaction zone with a first gas to create a first bubbling fluidized bed, and
   a LowOx gas supply coupled to the LowOx gas inlet and configured to deliver the first gas to the LowOx gas inlet, the first gas comprising an inert and/or mildly-oxidizing gas; and
  a HiOx reaction zone comprising:
   an oxidant gas inlet configured to fluidize at least a portion of the bed solids within the HiOx reaction zone with a second gas to create a second bubbling fluidized bed, and
   a HiOx gas supply coupled to the oxidant gas inlet and configured to deliver the second gas to the oxidant gas inlet, wherein the second gas is more oxidizing than the first gas;
 a gaswall separating a gas phases above the fluidized bed of bed solids into:
  a volatilization stage comprising a fuel inlet configured to convey the fuel into the volatilization stage; and
  a combustion stage comprising an exhaust gas outlet configured to convey an exhaust gas out of the combustion stage;
 a lower edge of the gaswall below the height of the first and/or second bubbling fluidized beds to separate the gas phases
 an opening providing for a flow of bed solids between the LowOx and HiOx reaction zones; and
 a first splashgenerator coupled to a first transport gas supply and configured to inject a transport gas into a second portion of the bed solids within the LowOx reaction zone to drive a drivenflow comprising bed solids from the LowOx reaction zone past the bedwall to the HiOx reaction zone.

2. The reactor of claim 1, wherein:
 the bedwall and gaswall are separated by a distance that is less than at least one of an expected height of the first bubbling fluidized bed and an expected bed height of the second bubbling fluidized bed; and
 the first splashgenerator is disposed between the bedwall and the gaswall.

3. The reactor of claim 1, wherein the first splashgenerator comprises a distributor plate having holes distributed across the distributor plate.

4. The reactor of claim 1, wherein the LowOx gas inlet extends beneath the gaswall.

5. The reactor of claim 1, further comprising:
 a passage between the LowOx and HiOx reaction zones, the passage comprising an opening in and/or below the gaswall and below at least one expected fluidized bed height of the first and second bubbling fluidized beds, the passage configured to provide for a returnflow of bed solids from the HiOx reaction zone to the LowOx reaction zone; and a passage gas inlet disposed:
  between the LowOx gas inlet and the oxidant gas inlet; and
  substantially beneath the gaswall;
  the passage gas inlet configured to fluidize at least a portion of the bed solids beneath the gaswall with a passage gas; and
a passage gas supply coupled to the passage gas inlet and configured to deliver the passage gas to the passage gas inlet, the passage gas having a different composition, pressure, and/or flow rate than that of at least one of the LowOx and HiOx gas inlets.

6. The reactor of claim 5, wherein the passage gas inlet comprises a second splashgenerator.

7. The reactor of claim 6, wherein the second splashgenerator is further configured to inject the passage gas with a directed momentum that is at least partially horizontal.

8. The reactor of claim 6, wherein the second splashgenerator comprises aligned jet nozzles.

9. The reactor of claim 1, wherein the HiOx reaction zone at least partially surrounds the LowOx reaction zone on at least three sides.

10. The reactor of claim 1, further comprising a baffle disposed substantially above the first splashgenerator and configured to direct the drivenflow from the LowOx reaction zone toward the HiOx reaction zone.

11. The reactor of claim 1, wherein the first splashgenerator comprises aligned jet nozzles and is configured to generate a splashzone comprising turbulent-fluidized, fast-fluidized, and/or entrained bed solids.

12. The reactor of claim 1, wherein the first splashgenerator is disposed between the bedwall and the gaswall, and the reactor further comprises a buffer distance between the first splashgenerator and the gaswall, the buffer distance at least 20% of a height of a lower edge of the gaswall above the LowOx gas inlet.

13. The reactor of claim 1, wherein:
  the first splashgenerator is disposed between the bedwall and the gaswall; and
  the transport gas comprises flue gas.

14. The reactor of claim 13, wherein the first splashgenerator comprises at least one of aligned jet nozzles, high velocity nozzles, and directed nozzles.

15. The reactor of claim 1, wherein the first splashgenerator is configured to inject the transport gas with a directed momentum that is at least partially horizontal.

16. The reactor of claim 1, wherein the first splashgenerator is configured to inject the transport gas at a velocity, pressure, and/or flow rate that is at least 50% higher than the corresponding velocity, pressure, or flow rate of at least one of the LowOx and oxidant gas inlets.

17. The reactor of claim 1, wherein the gaswall has a thickness that is at least 20% of at least one expected fluidized bed height.

18. The reactor of claim 1, wherein the first splashgenerator comprises injection nozzles through which the transport gas is injected.

19. The reactor of claim 1, wherein the transport gas is less oxidizing than the second gas.

20. The reactor of claim 1, wherein the first splashgenerator is further configured to generate pulsed splashes.

21. A method comprising:
  providing the fluidized bed reactor of claim 10;
  fluidizing the bed to yield fluidized beds in each of the first and second reaction zones; and
  operating the splashgenerator to create a drivenflow of bed solids from the first reaction zone to the second reaction zone.

* * * * *